US012785481B2

(12) United States Patent
Ohzu et al.

(10) Patent No.: US 12,785,481 B2
(45) Date of Patent: Nov. 3, 2026

(54) ROTATING ELECTRIC MACHINE AND INSULATING MEMBER

(71) Applicant: Honda Motor Co., Ltd., Tokyo (JP)

(72) Inventors: Tatsuya Ohzu, Tokyo (JP); Masashi Inoue, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 247 days.

(21) Appl. No.: 18/587,449

(22) Filed: Feb. 26, 2024

(65) Prior Publication Data

US 2024/0305153 A1 Sep. 12, 2024

(30) Foreign Application Priority Data

Mar. 6, 2023 (JP) ................................ 2023-033325

(51) Int. Cl.

*H02K 3/24* (2006.01)
*H02K 1/20* (2006.01)
*H02K 3/30* (2006.01)
*H02K 3/34* (2006.01)

(52) U.S. Cl.

CPC ................ *H02K 3/24* (2013.01); *H02K 1/20* (2013.01); *H02K 3/30* (2013.01); *H02K 3/345* (2013.01)

(58) Field of Classification Search

CPC .. H02K 1/20; H02K 3/24; H02K 3/30; H02K 3/345; H02K 9/19
See application file for complete search history.

(56) References Cited

U.S. PATENT DOCUMENTS

| | | | | |
|---|---|---|---|---|
| 2007/0138878 A1* | 6/2007 | Down | ...................... | H02K 3/24 310/52 |
| 2022/0286005 A1* | 9/2022 | Ueda | ........................ | H02K 3/30 |
| 2024/0204584 A1* | 6/2024 | Ito | .......................... | H02K 1/165 |

FOREIGN PATENT DOCUMENTS

JP 2017034873 A 2/2017

* cited by examiner

*Primary Examiner* — Christopher M Koehler
*Assistant Examiner* — Ethan Nguyen Vo
(74) *Attorney, Agent, or Firm* — Duft & Bornsen, PC

(57) ABSTRACT

A rotating electric machine comprises a rotor and a stator. The stator has a stator coil extending in an axial direction, an insulating member enclosing the stator coil, and an annular stator core in which a plurality of slots into which the stator coil enclosed by the insulating member are inserted are formed. In the stator core, a channel for introducing a cooling medium into each of the plurality of slots are formed. In the insulating member, an introduction opening for guiding the cooling medium introduced into a slot, among the plurality of slots, to a space enclosed by the insulating member is provided.

12 Claims, 28 Drawing Sheets

ROTATING ELECTRIC MACHINE AND INSULATING MEMBER

CROSS-REFERENCE TO RELATED APPLICATION

This application is based upon and claims the benefit of priority from Japanese Patent Application No. 2023-033325 filed on Mar. 6, 2023, the content of which is incorporated herein by reference.

BACKGROUND OF THE INVENTION

Field of the Invention

The present invention relates to a rotating electric machine and an insulating member.

Description of the Related Art

Conventionally, as a configuration for cooling a coil end of a stator coil, a rotating electric machine equipped with a cooling pipe that supplies a cooling medium from above the coil end is known. Such a rotating electrical machine is described, for example, in JP 2017-034873 A.

However, in the rotating electrical machine described in JP 2017-034873 A, cooling of the entire stator coil including the coil portion stored in the slot is insufficient because of the configuration in which the cooling medium is supplied to the coil end for cooling.

SUMMARY OF THE INVENTION

An aspect of the present invention is a rotating electric machine comprises a rotor and a stator. The stator has a stator coil extending in an axial direction, an insulating member enclosing the stator coil, and an annular stator core in which a plurality of slots into which the stator coil enclosed by the insulating member are inserted are formed. In the stator core, a channel for introducing a cooling medium into each of the plurality of slots are formed. In the insulating member, an introduction opening for guiding the cooling medium introduced into a slot, among the plurality of slots, to a space enclosed by the insulating member is provided.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, embodiments of the invention will be described with reference to the views. The following description and views are illustrative examples to explain the invention, and may be abbreviated or simplified as appropriate for the sake of clarity of explanation. In the following description, the same or similar elements and processes may be marked with the same reference sign and duplicate explanations may be omitted. The following description is only an example of embodiments of the invention, and the invention is not limited to the following embodiments, but can be implemented in various other embodiments.

First Embodiment

Figure 1:
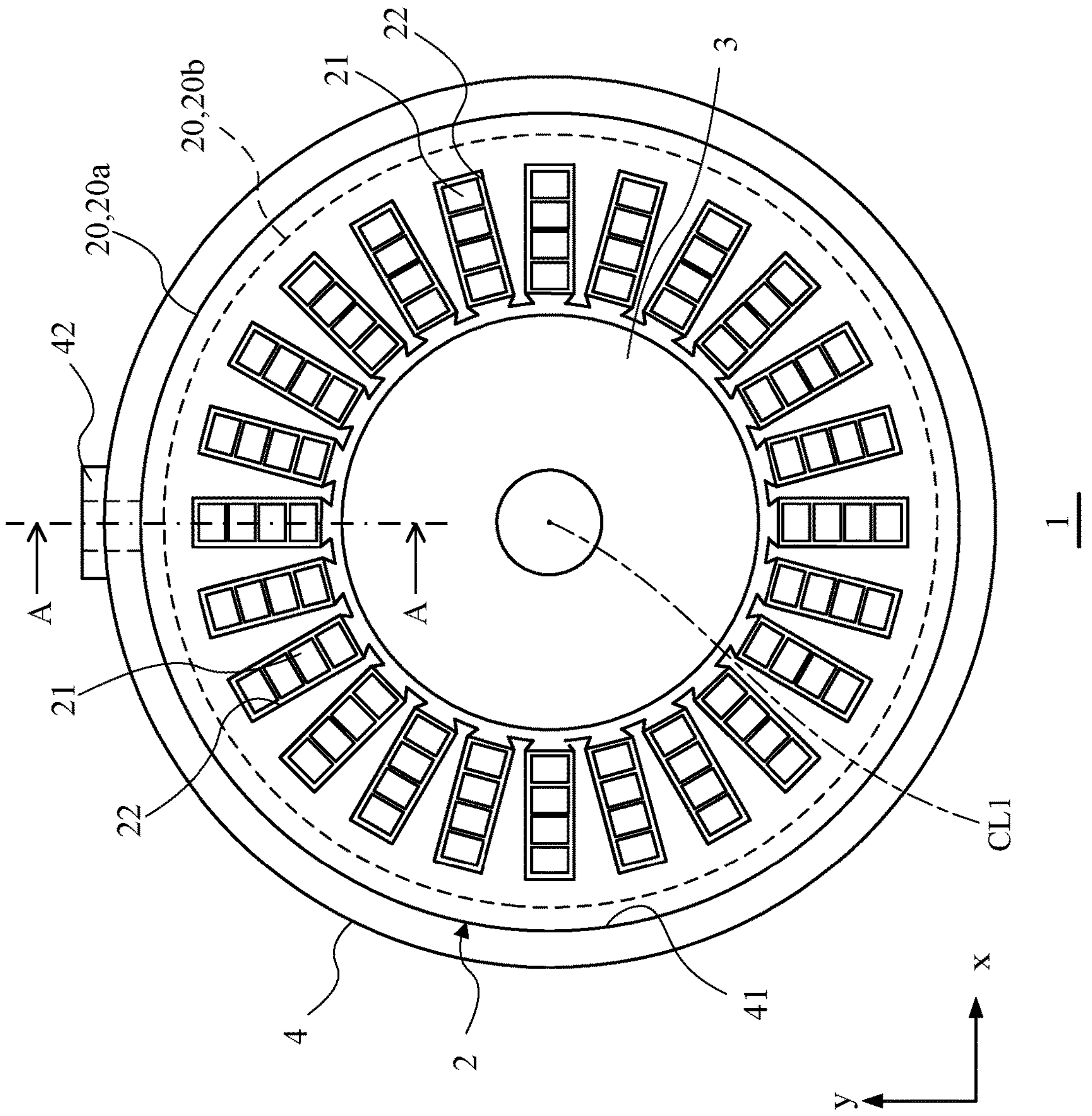
FIG. 1 is a schematic configuration view of a rotating electric machine according to a first embodiment of the invention.

FIGS. 1 to 7C are views for explaining a rotating electric machine 1 according to a first embodiment of the present invention. FIG. 1 is a front view of the rotating electric machine 1. With the use of three axes (x-axis, y-axis, z-axis) orthogonal to each other, the rotating electric machine 1 is illustrated on an xy plane in FIG. 1. That is, FIG. 1 is a view of a stator 2 and a rotor 3 of the rotating electric machine 1 as viewed from the positive direction of the z coordinate axis along an axial direction of the rotor 3. Hereinafter, a direction in which an axis CL1 passing through the center of a rotation axis of the rotor 3 extends is defined as an axial direction, a direction extending radially from the axis CL1 is defined as a radial direction, and a direction along a circumference of a circle centered on the axis CL1 is defined as a circumferential direction.

Figure 2:
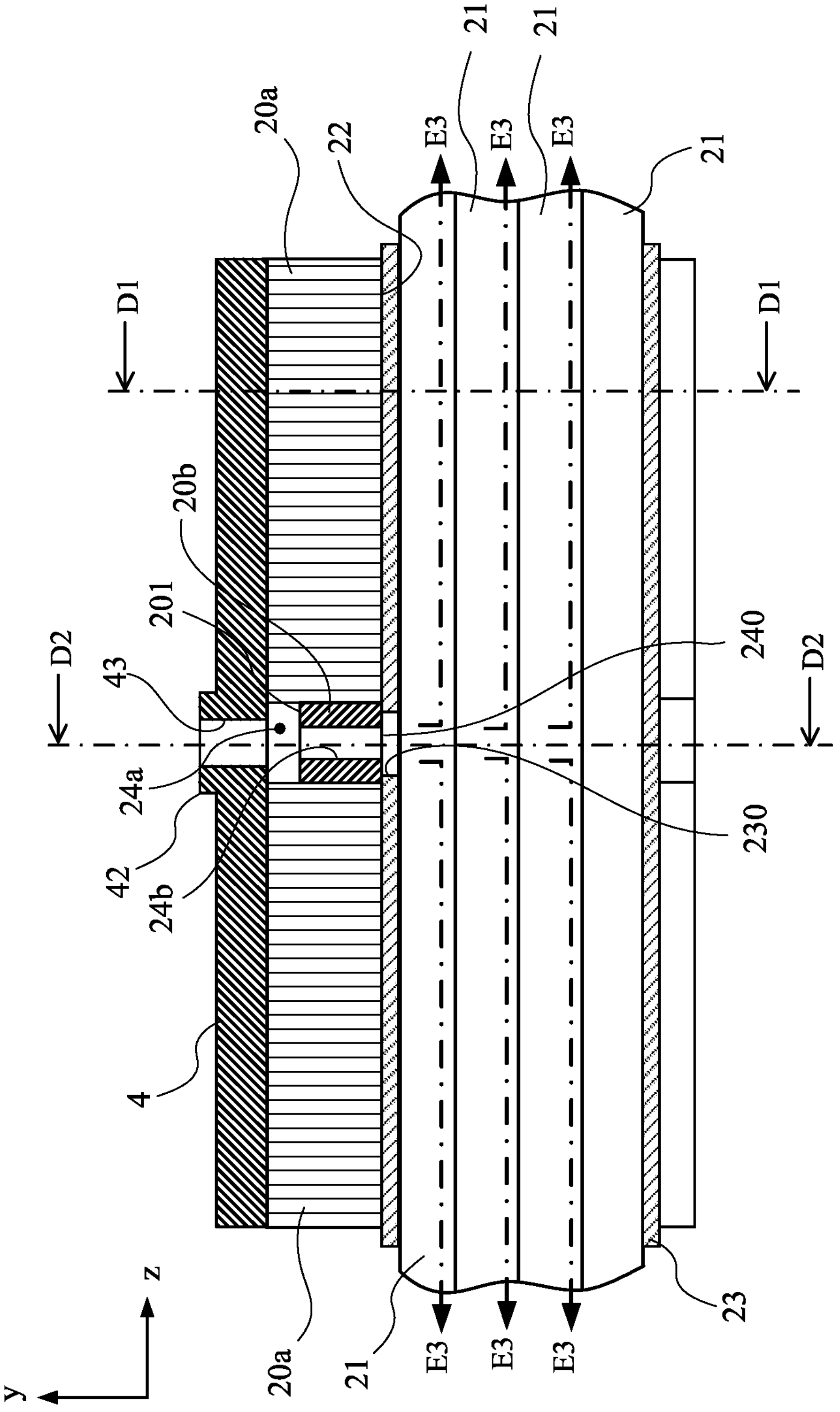
FIG. 2 is a sectional view taken along a line A-A in FIG. 1.

FIG. 2 is a sectional view taken along a line A-A in FIG. 1. The rotating electric machine 1 includes a case 4, the annular stator 2 placed in the case 4, and the rotor 3 placed on the inner side of the stator 2. The stator 2 includes stator cores 20 (20*a*, 20*b*) and stator coils 21.

Figure 3:
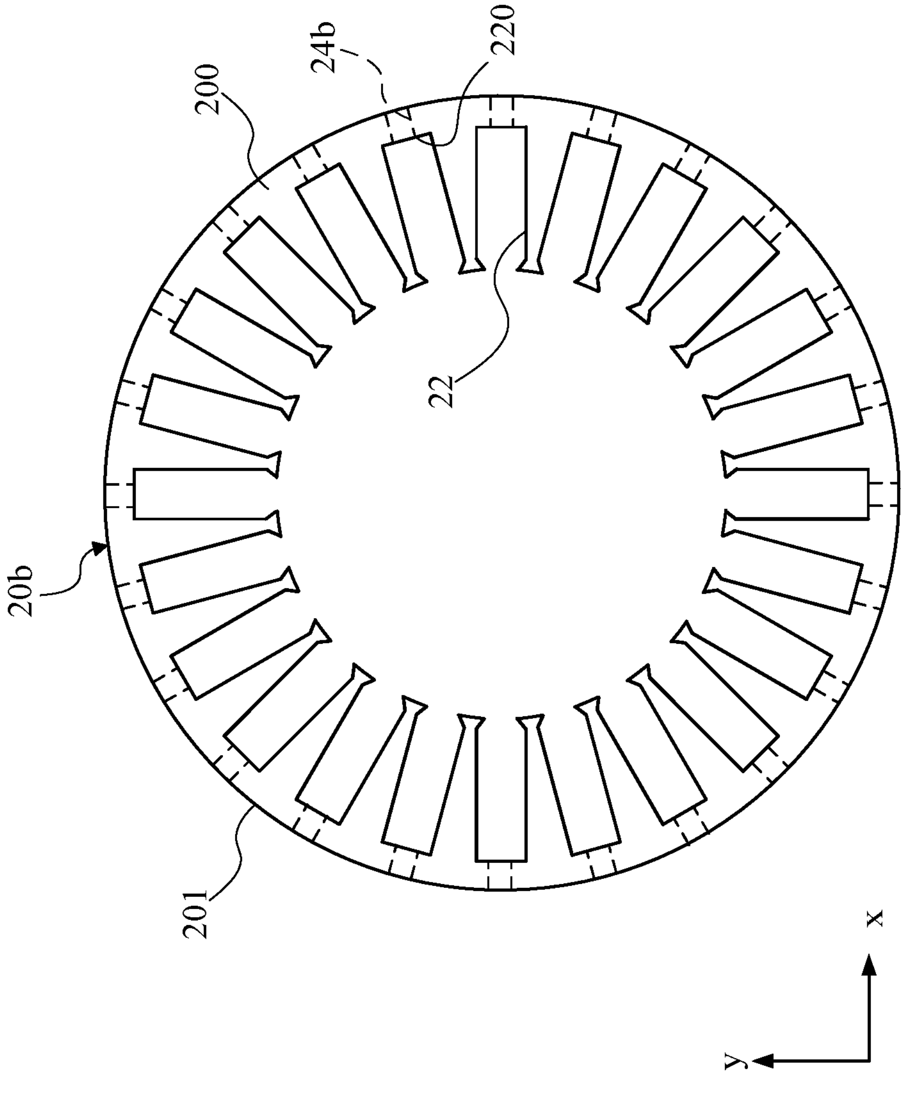
FIG. 3 is a front view of the stator core for introducing a cooling medium in FIG. 1.

As illustrated in FIG. 2, a pair of stator cores 20*a* are provided such that the stator core 20*b* for introducing a cooling medium is interposed between the stator cores 20*a* along the axial direction. The shapes of the stator cores 20*a* and the stator core 20*b* as viewed from the Z direction are the same as each other except for their ends on the outer-diameter side. The stator cores 20*a* and 20*b* are formed of, for example, stacked electromagnetic steel sheets. The stator core 20*b* may be a dust core or may be formed by resin molding. As illustrated in FIG. 1, a plurality of slots 22 are formed in a region on the inner side of the stator cores 20*a* and 20*b*. FIG. 3 is a front view of the stator core 20*b*. The stator core 20*b* has an outer diameter smaller than the outer diameter of the stator core 20*a*. Further, in the stator core 20*b*, a channel 24*b* penetrating a space between a slot bottom surface 220 of the slot 22 and an outer surface 201 of a core back 200 is formed. As illustrated in FIG. 1, the stator coil 21 is housed in each of the plurality of slots 22 of the stator cores 20 (20*a*, 20*b*). In the illustrated example, a rectangular conductor is used for the stator coil 21, but a round conductor may be used.

In each of the slots 22, four coil conductors forming the coil sides of the stator coils 21 are housed. In the slot 22, an insulating member 23 is placed so as to surround the periphery of the stator coils 21 (four coil conductors), in other words, so as to enclose the stator coils 21 (see FIG. 4). For the insulating member 23, for example, insulating paper, a synthetic resin sheet, or the like is used.

As illustrated in FIG. 2, the case 4 is provided with a cooling-medium introduction portion 42. In the cooling-medium introduction portion 42, a through hole 43 radially penetrating the case 4 is opened, and a cooling medium is guided into the case via the through hole 43. The through hole 43 is provided at a position facing the outer surface 201 of the stator core 20*b*. An annular space that is interposed between the outer surface 201 of the stator core 20*b* and the inner surface of the case 4 and is centered on the axis CL1 (FIG. 1) forms a channel 24*a* for a cooling medium. The channel 24*a* communicates with the through hole 43 of the case 4 and the channel 24*b* of the stator core 20*b*.

The channel 24*b* of the stator core 20*b* includes an opening 240 of the slot bottom surface 220. In the insulating member 23 enclosing the stator coils 21 in the slot 22, an opening 230 is formed at a position facing the opening 240.

Figure 4:
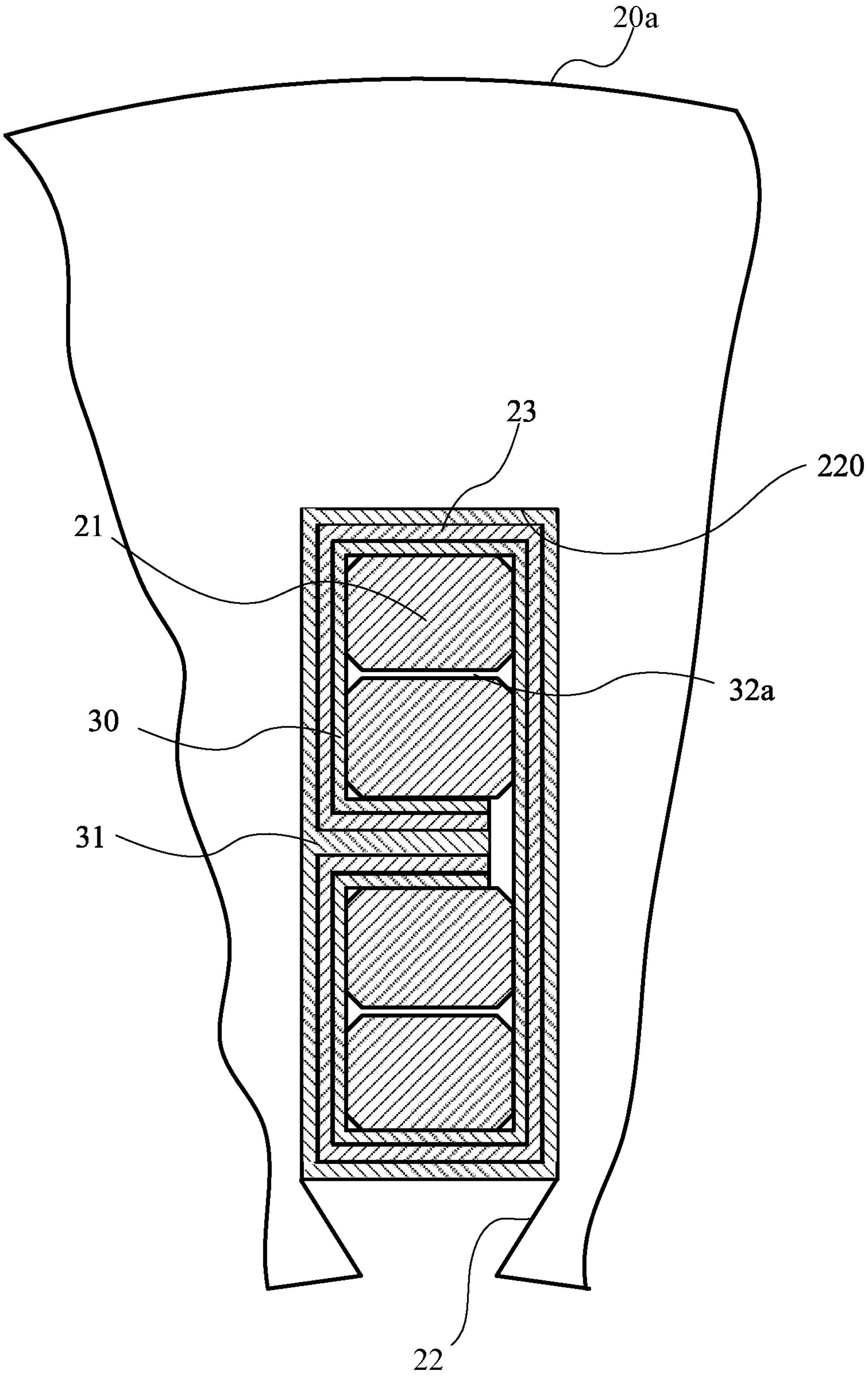
FIG. 4 is a sectional view taken along a line D1-D1 in FIG. 2.

FIG. 4 is a sectional view taken along a line D1-D1 in the stator core 20*a* in FIG. 2. As illustrated in FIG. 4, the stator coils 21 enclosed by the insulating member 23 is placed in the slot 22. An adhesive layer 30 is provided on the inner-surface side of the insulating member 23, and a foam layer 31 is provided on the outer-surface side. The insulating member 23 is adhered to the outer surface of each stator coil 21 by the adhesive layer 30. A gap between the insulating member 23 and the slot 22 is filled with the foam layer 31. For the adhesive layer 30, for example, thermosetting resin or the like is used, and for the foam layer 31, for example, a mixture of thermosetting resin or the like with a foam material is used.

The adhesive layer 30 and the foam layer 31 are applied in advance to the inner-surface side and the outer-surface side of the sheet-like insulating member 23, respectively, and the conductors of the stator coils 21 are enclosed by the insulating member 23. The slot 22 formed in the stator core 20 is a semi-closed slot having an inner-diameter side end that is narrowed. The stator coils 21 enclosed by the insulating member 23 are inserted into the slot 22 from the outside of the stator core 20 along the axial direction. After that, a heat-curing process of the adhesive layer 30 and the foam layer 31 is performed, so that the insulating member 23 and the stator coils 21 are adhered to each other, and a gap between the wall surface of the slot 22 and the insulating member 23 is filled with the foam layer 31. The stator coil 21 is not perfectly linear, and has undulation, warpage, and the like. Thus, a gap 32*a* is likely to be formed between adjacent stator coils 21.

Figure 5:
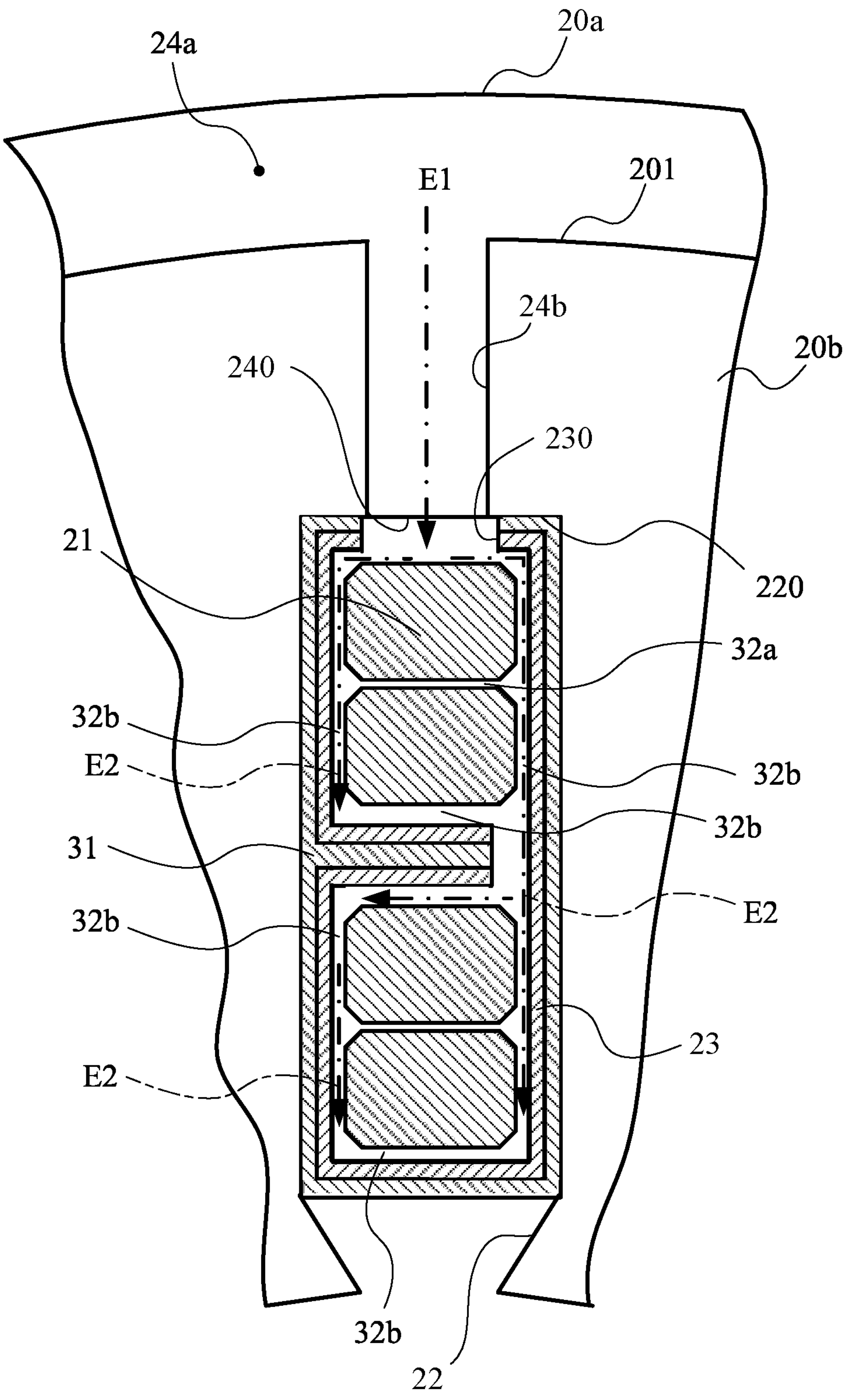
FIG. 5 is a sectional view taken along a line D2-D2 in FIG. 2.

FIG. 5 is a sectional view taken along a line D2-D2 in the stator core 20*b* of FIG. 2, and, in particular, a sectional view of a portion where the channel 24*b* is provided. As illustrated in FIG. 5, in the slot bottom surface 220, the opening 240 of the channel 24*b* is provided. In the insulating member 23, the opening 230 is provided at a position facing the opening 240. Thus, there is no foam layer 31 facing the opening 240. Further, the adhesive layer 30 (FIG. 4) is not provided between the insulating member 23 and the stator coils 21, and thus, a gap 32*b* is formed between the insulating member 23 and the stator coils 21.

Figure 6:
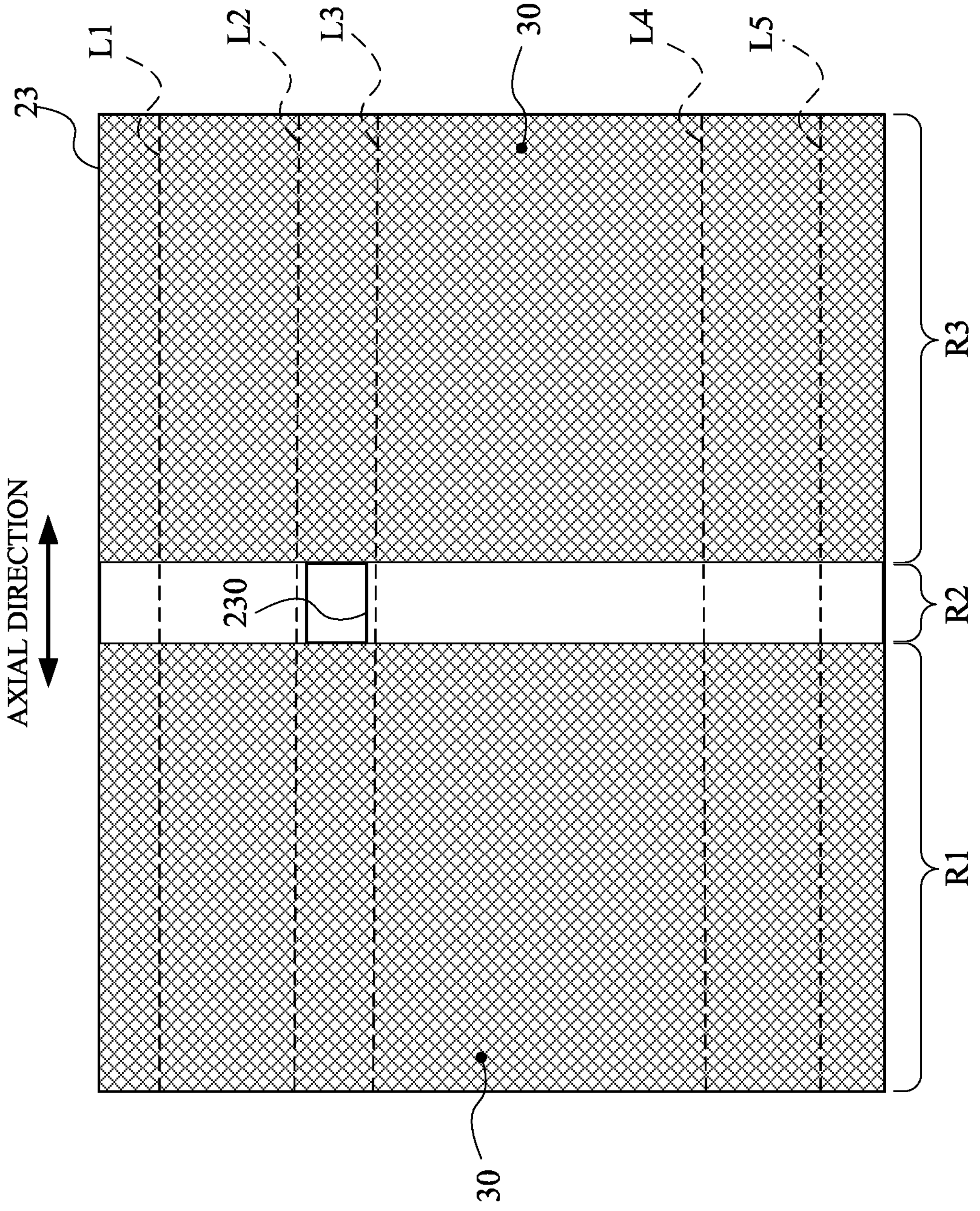
FIG. 6 is a view illustrating a state in which the insulating member in FIG. 1 is developed.

FIG. 6 is a view illustrating the inner-surface side of the sheet-like insulating member 23 when it is developed. Broken lines L1 to L5 indicate bending points that are to be bent in enclosing the stator coils 21 with the insulating member 23. A region between the broken line L2 and the broken line L3 in which the opening 230 is formed is a region facing the slot bottom surface 220 of the slot 22. As illustrated in FIG. 6, the adhesive layer 30 is provided in a region R1 on the left side along the axial direction and in a region R3 on the right side along the axial direction with respect to the opening 230. The adhesive layer 30 is not provided in a central region R2 along the axial direction where the opening 230 is placed. FIG. 4 is a sectional view of the region R3, and FIG. 5 is a sectional view of the region R2. Although not illustrated, on the outer-surface side of the insulating member 23, the foam layer 31 is provided in all regions except the opening 230.

Figure 7A:
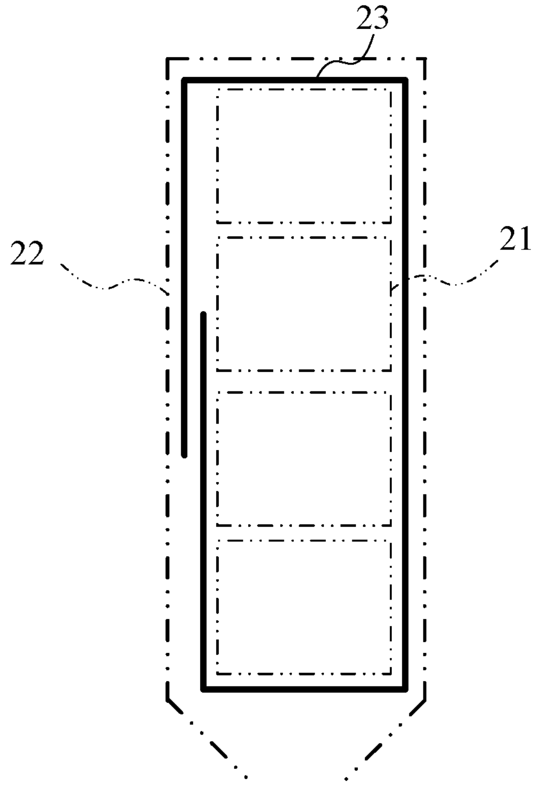
FIG. 7A is a view illustrating an example of the insulating member.
Figure 7B:
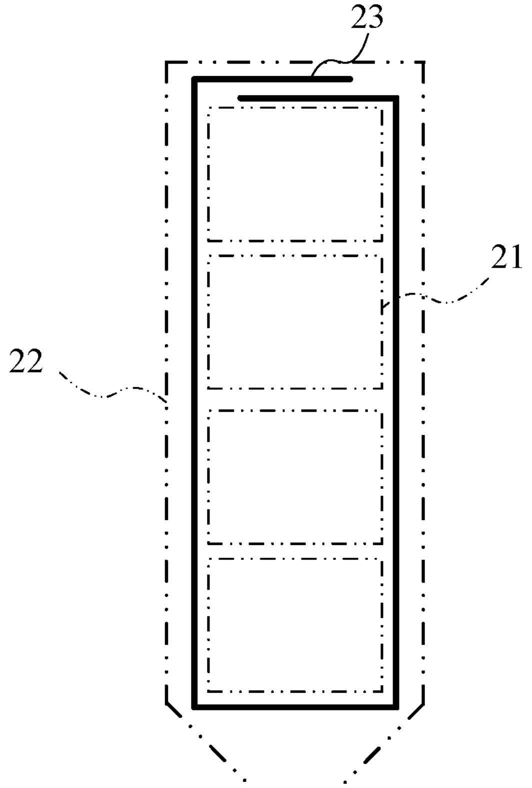
FIG. 7B is a view illustrating another example of the insulating member.
Figure 7C:
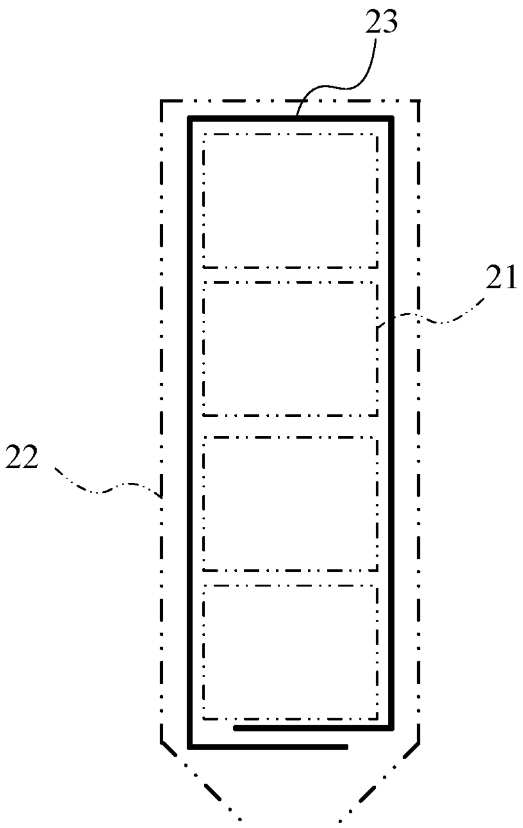
FIG. 7C is a view illustrating further another example of the insulating member.

The manner of enclosing the stator coils 21 with the insulating member 23 is not limited to the manner illustrated in FIG. 4. For example, the sheet-like insulating member 23 may be bent as illustrated in FIGS. 7A, 7B, and 7C, to enclose the stator coils 21. Specifically, a point where the ends of the insulating member 23 overlap each other when the insulating member 23 is bent may be located at a position facing the side surface of the slot 22 as illustrated in FIG. 7A, may be located at a position facing the slot bottom surface as illustrated in FIG. 7B, or may be located at a position facing the slot opening on the inner-diameter side of the slot 22 as illustrated in FIG. 7C.

Next, a path through which the cooling medium flows will be described. The cooling medium is supplied from the outside to the channel 24*a* via the through hole 43 of the case 4. For the cooling medium, for example, cooling oil is used. The cooling medium supplied to the channel 24*a* flows in the annular channel 24*a* along the circumferential direction, and flows into each channel 24*b* as indicated by an arrow E1 in FIG. 5.

The cooling medium flowing into the channel 24*b* flows into the gap 32*b* between the insulating member 23 and the stator coil 21 inside the insulating member 23 through the opening 240 and the opening 230 as illustrated in FIG. 5. Then, as indicated by an arrow E2, the cooling medium flows in the gap 32*b* toward the inner side of the stator core 20. Further, the cooling medium in the gap 32*b* enters the gap 32*a* between the stator coils 21. The cooling medium that has entered the gaps 32*a* and 32*b* flows in the gaps 32*a* and 32*b* (not illustrated) toward the coil ends along the axial direction as indicated by an arrow E3 in FIG. 2. The cooling medium flowing along the axial direction is finally discharged to the coil end of the stator coils 21.

As described above, the cooling medium flowing into the slot 22 through the channel 24*b* is guided to the gaps 32*a* and 32*b* of the enclosed space inside the insulating member 23. Thus, the cooling medium comes into contact with the stator coils 21, and the stator coils 21 are directly cooled. As a result, the stator coils 21 can be efficiently cooled by the cooling medium, which can improve the cooling effect. Further, the cooling medium flows toward the coil end through the gaps 32*a* and 32*b* and is discharged along the axial direction. Thus, the coil end is cooled by the cooling medium, and the cooling medium can be prevented from entering an air gap between the stator 2 and the rotor 3.

First Modification

Figure 8:
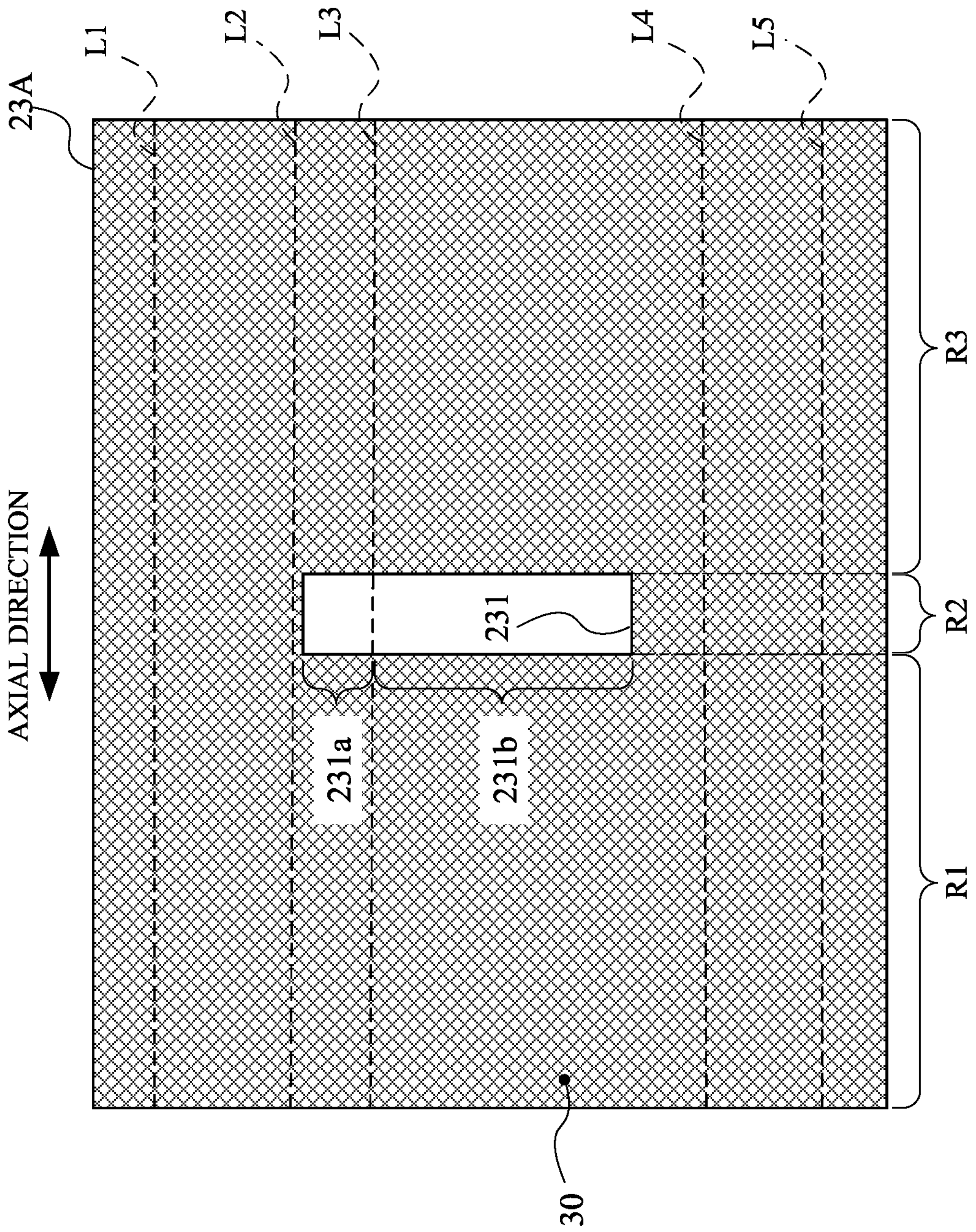
FIG. 8 is a view illustrating a first modification which is a modification of FIG. 6.

FIG. 8 is a modification (first modification) of FIG. 6, and is a view illustrating the inner-surface side of an insulating member 23A when it is developed. Broken lines L1 to L5 indicate bending points that are to be bent in enclosing the stator coils 21 with the insulating member 23A. As illustrated in FIG. 8, in the insulating member 23A, an opening 231 is provided in a central region R2, instead of the opening 230 described above. A region between the broken line L2 and the broken line L3 in the insulating member 23A is a region facing the slot bottom surface 220 of the slot 22.

The opening 231 has an opening region 231*a* facing the slot bottom surface 220 and an opening region 231*b* facing the side surface of the slot 22. The adhesive layer 30 is provided in all regions of the inner surface of the insulating member 23A except the opening 231. On the outer-surface side of the insulating member 23A, the foam layer 31 is provided in all regions except the opening 231.

Figure 9:
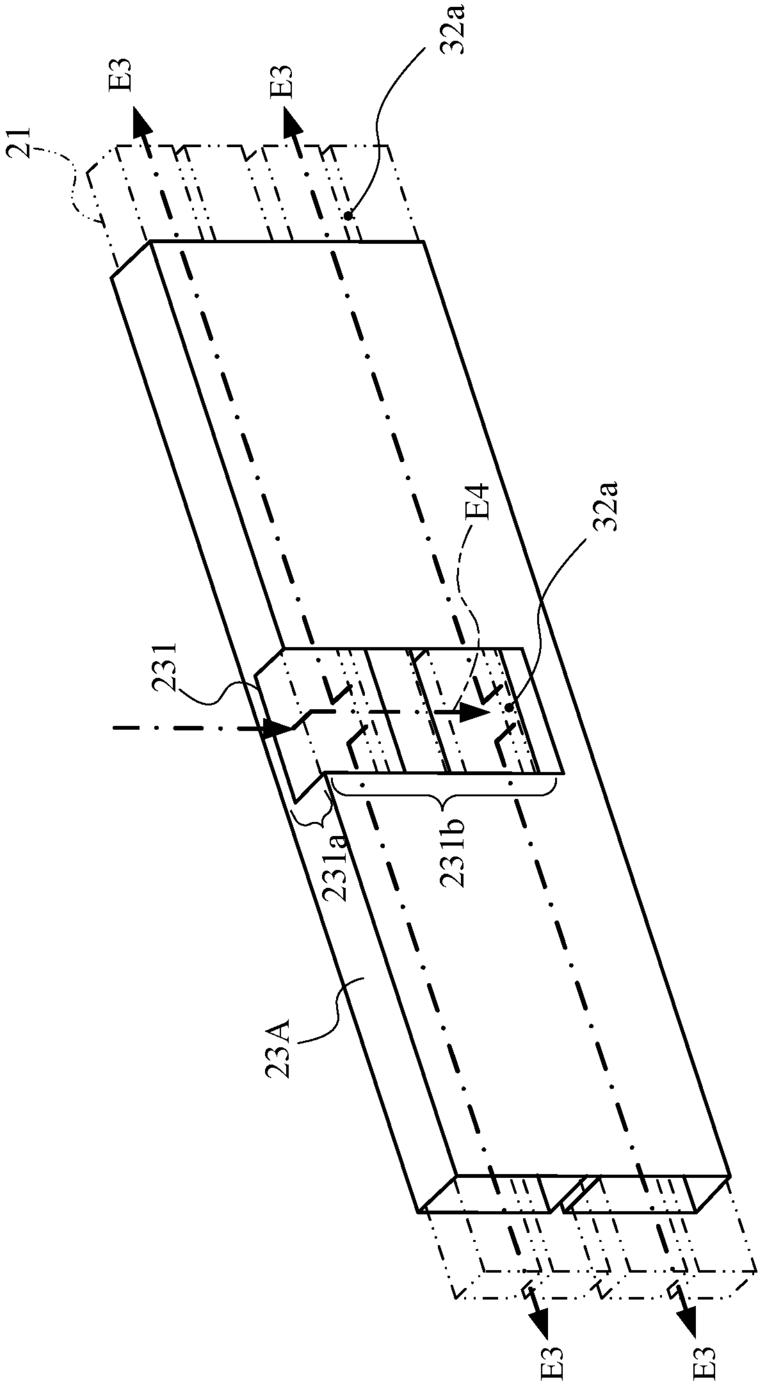
FIG. 9 is a perspective view of the insulating member of FIG. 8 when it is bent.

FIG. 9 is a perspective view of the insulating member 23A of FIG. 8 when it is bent so as to enclose the stator coils 21. In FIG. 9, the stator coils 21 are indicated by an alternate long and two dashes line for convenience. As illustrated in FIG. 9, the opening 231 (opening regions 231*a*, 231*b*) extends radially inward to a position where the side surfaces of the stacked stator coils 21 face each other. Thus, the gap 32*a* between the adjacent stator coils 21 is exposed through the opening 231.

Figure 10:
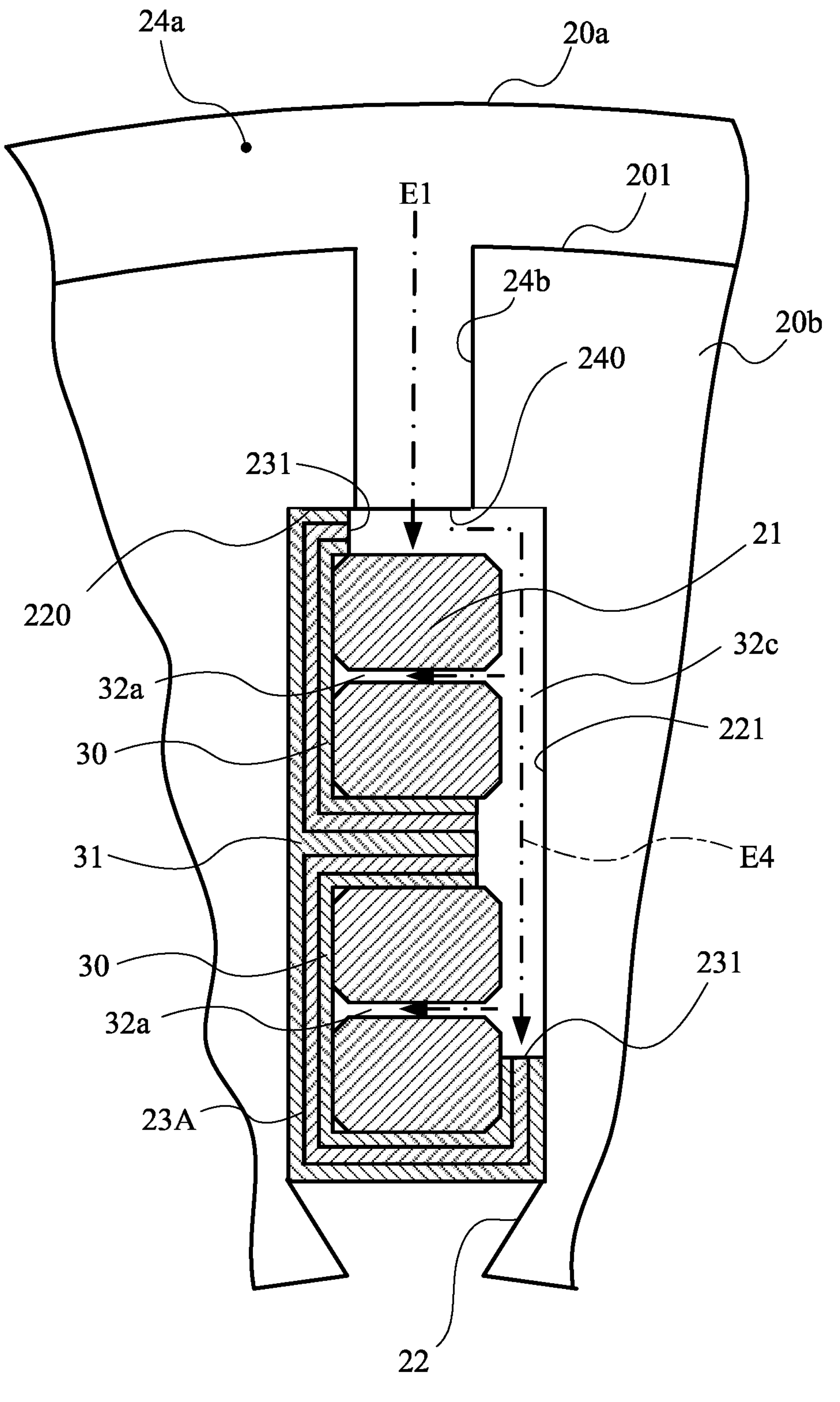
FIG. 10 is a sectional view of the first modification.

FIG. 10 is a sectional view taken along a line D2-D2 in FIG. 2 in a case where the insulating member 23A is used instead of the insulating member 23, and corresponds to a modification (first modification) of FIG. 5. As illustrated in FIG. 10, the opening 231 is provided in a surface facing the slot bottom surface 220 of the slot 22 and a slot side surface 221 on the right side in the drawing, in the insulating member 23A enclosing the stator coils 21. As a result, a gap 32*c* is formed between the stator coils 21 and the slot side surface 221. The cooling medium flowing into the slot 22 from the channel 24*b* via the opening 240 flows through the gap 32*c* between the stator coils 21 and the slot side surface 221 from the radially outer side to the radially inner side as indicated by an arrow E4 of an alternate long and short dash line. Further, the cooling medium in the gap 32*c* enters the gap 32*a* between the stator coils 21. Then, as indicated by an arrow E3 in FIG. 9, the cooling medium flows in the gap 32*a* toward the coil ends at both axial ends, along the axial direction.

As described above, the opening 231 in the first modification extends from the position facing the opening 240 of the slot bottom surface 220 to the position facing the slot side surface 221. This allows the cooling medium to easily flow toward the inner side of the stator core 20 in the space enclosed by the insulating member 23A, which enables satisfactory flow of the cooling medium into the gap 32*a* on the inner side of the stator core 20. Consequently, the cooling effect of the cooling medium on the stator coils 21 can be further improved.

Second Modification

Figure 11:
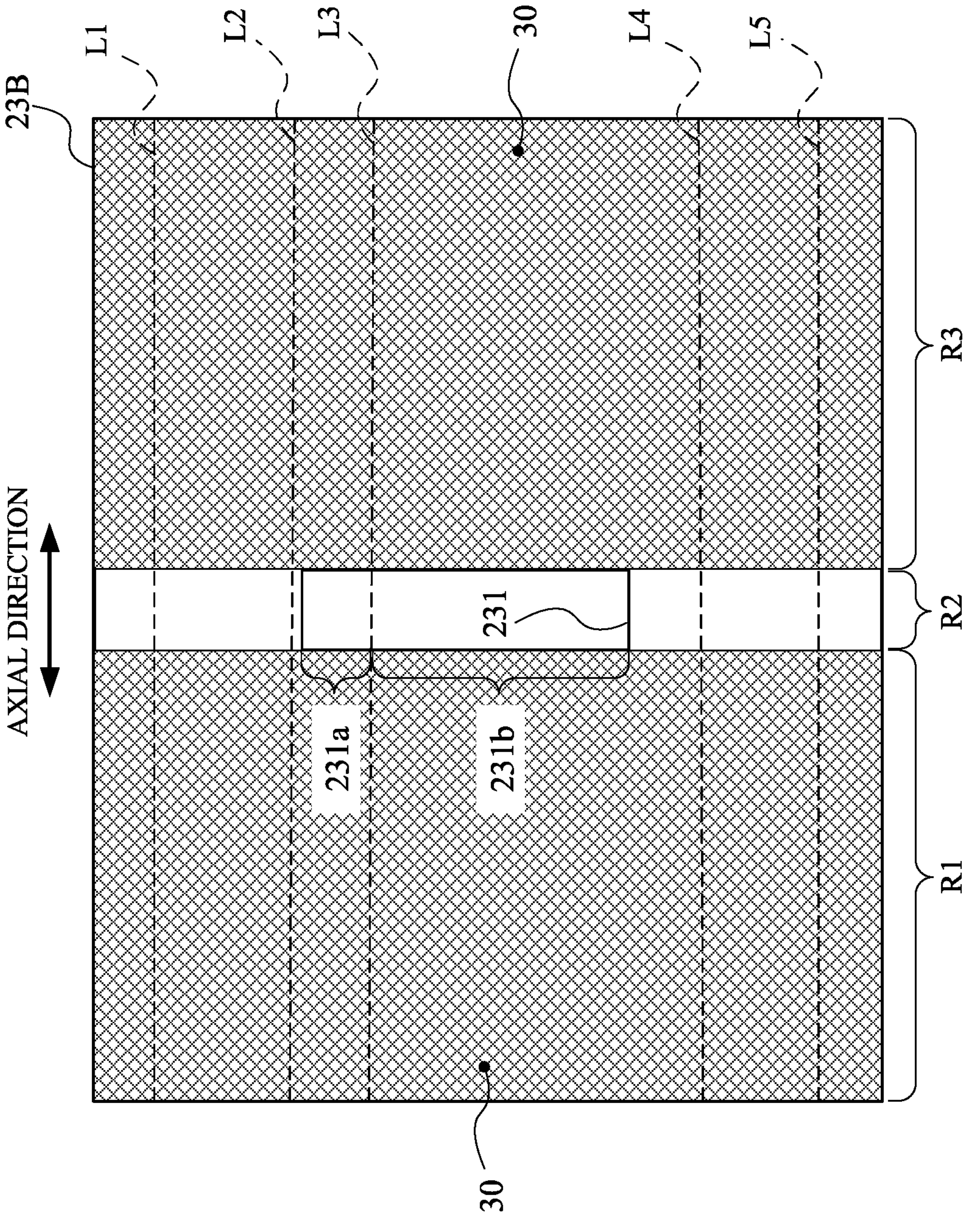
FIG. 11 is a view illustrating a second modification which is a modification of FIG. 6.
Figure 12:
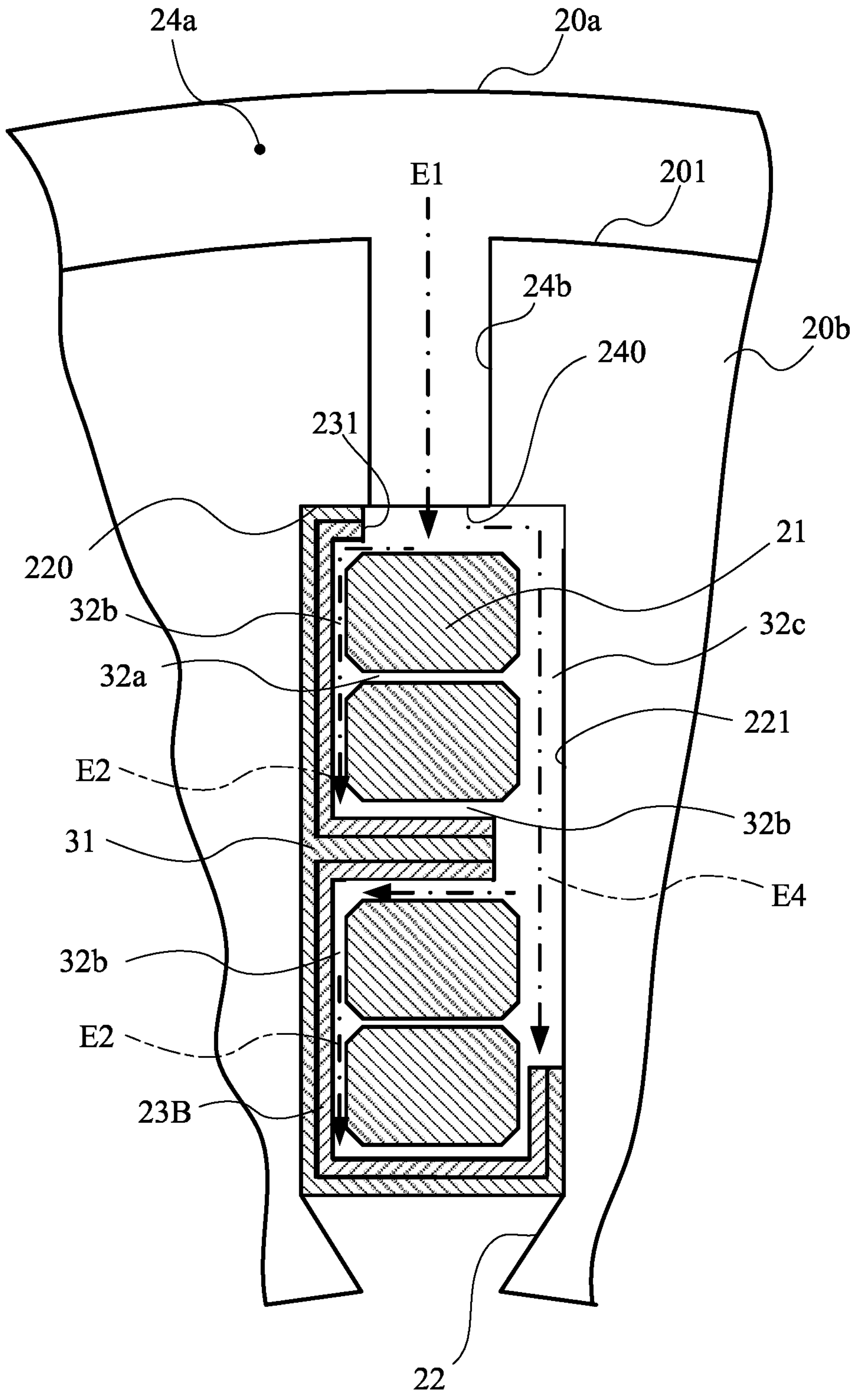
FIG. 12 is a sectional view of the second modification.

FIG. 11 illustrates another modification (second modification) of FIG. 6, and is a view illustrating the inner-surface side of an insulating member 23B when it is developed. As illustrated in FIG. 11, in the insulating member 23B, the adhesive layer 30 is not provided in the central region R2 where the opening 231 is provided. The configuration of the insulating member 23B in the other respects is similar to that of the insulating member 23A in FIG. 8. FIG. 12 is a sectional view taken along the line D2-D2 in FIG. 2 in a case where the insulating member 23B is used instead of the insulating member 23, and corresponds to another modification (second modification) of FIG. 5. The adhesive layer 30 is not provided in the central region R2 of the insulating member 23B. Thus, as illustrated in FIG. 12, unlike in the case of FIG. 10 described above, the gap 32*b* is formed between the stator coils 21 and the insulating member 23B.

The cooling medium flowing into the slot 22 from the channel 24*b* via the opening 240 flows radially inward as indicated by the arrows E2 and E4 of an alternate long and dash line. As described above, in the second modification, the flow indicated by E2 is generated in addition to the flow indicated by E4 in the first modification, and the cooling medium flows through the gap 32*b* between the stator coils 21 and the insulating member 23B. The cooling medium flowing through the gap 32*b* enters the gap 32*a* between the stator coils 21, and flows in the gap 32*a* toward the coil ends at both axial ends, along the axial direction. As described above, in the insulating member 23B in the second modification, the gap 32*b* is formed between the insulating member 23B and the coils 21 in the central region R2 where the opening 231 is provided. Therefore, the cooling medium more easily flows into the gap 32*a* between the stator coils 21, which can improve the cooling efficiency.

Third Modification

Figure 13:
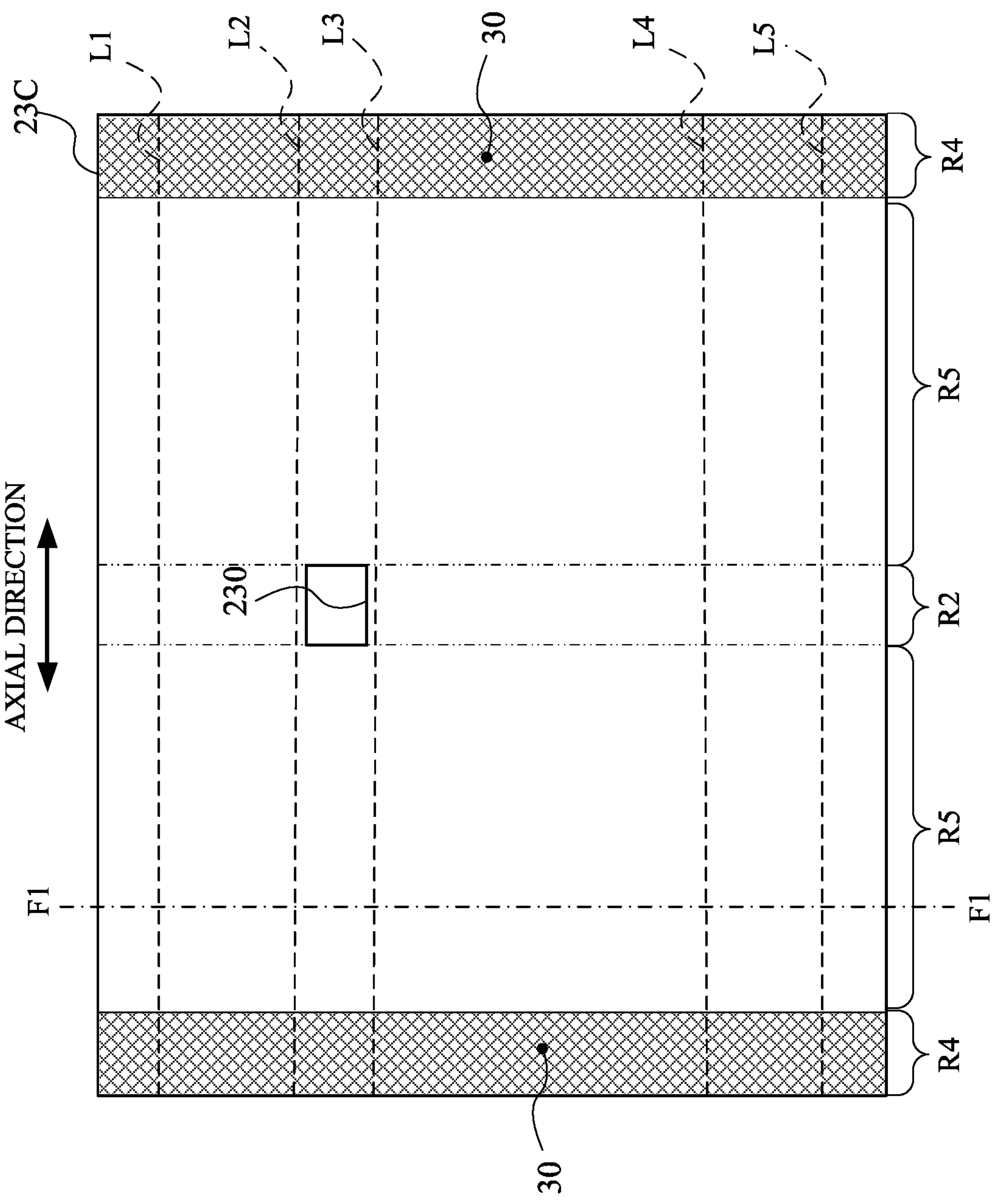
FIG. 13 is a view illustrating a third modification which is a modification of FIG. 6.

FIG. 13 illustrates another different modification (third modification) of FIG. 6, and is a view illustrating the inner-surface side of an insulating member 23C when it is developed. As compared to the insulating member 23 in FIG. 6, the insulating member 23C is different only in the range covered by the adhesive layer 30 provided on the inner-surface side, and the configurations of both the insulating members are the same in the other respects. As illustrated in FIG. 13, in the third modification, the adhesive layer 30 is provided only in regions R4 at both axial ends of the insulating member 23C, and is not provided in the central region R2 or regions R5 between the central region R2 and the regions R4.

Figure 14:
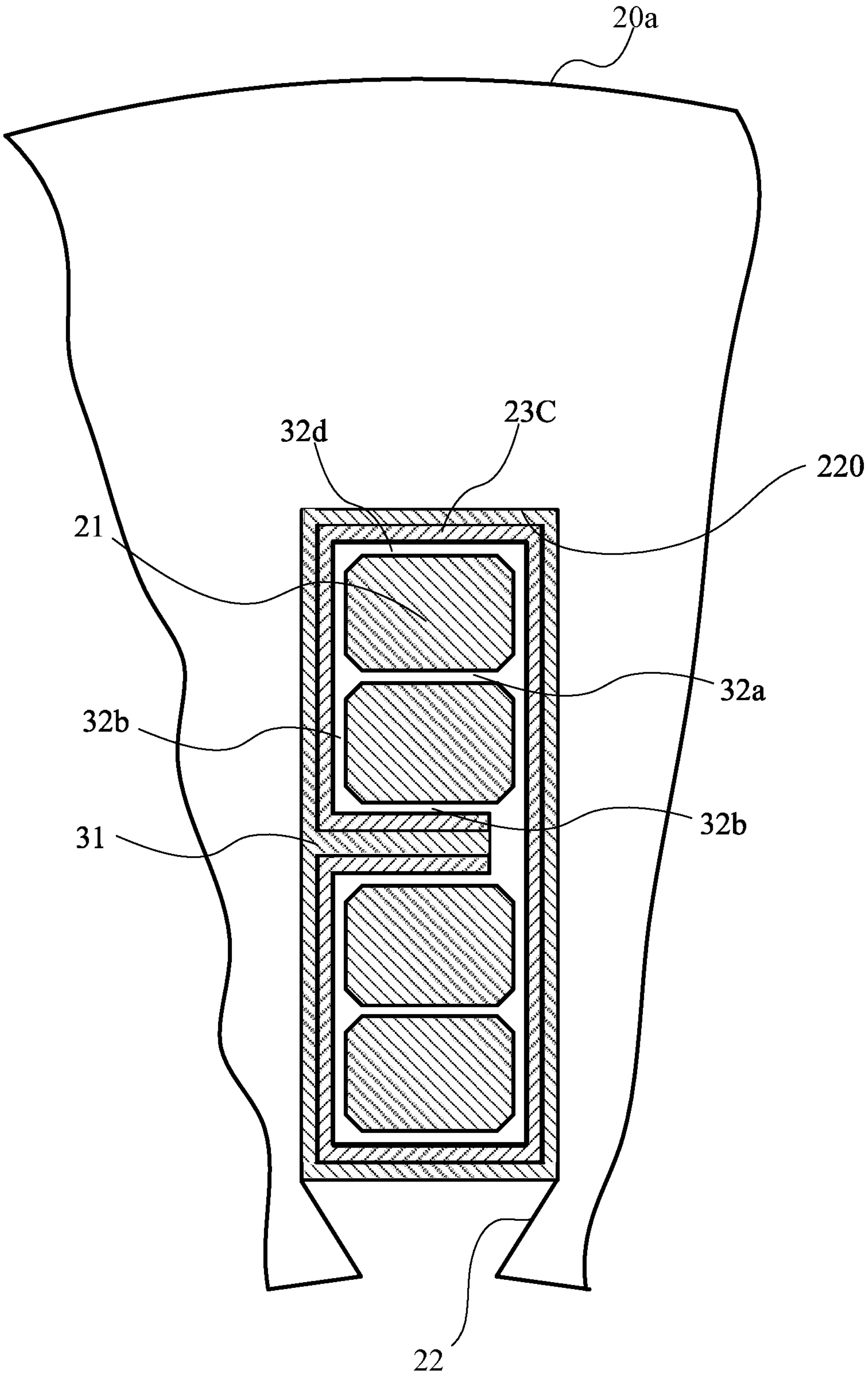
FIG. 14 is a sectional view of the third modification.

FIG. 14 is a sectional view of the insulating member 23C and the stator coils 21 housed in the slot 22, taken along a line F1-F1 in FIG. 13. As illustrated in FIG. 14, because of absence of the adhesive layer 30 on the inner-surface side of the insulating member 23C, the gap 32*b* is formed between the insulating member 23C and the stator coils 21. Thus, the cooling medium flowing into the inside of the insulating member 23C via the opening 230 of the insulating member 23C passes through the gap 32*b* and flows along the axial direction in which the stator coil 21 extends. Therefore, the cooling medium easily flows from the central region R2 of the stator coil 21 to the regions R4 at both ends, which can further improve the cooling effect of the cooling medium on the stator coils 21.

Although not illustrated, also in the case of the insulating member 23B in which the opening 231 as illustrated in FIG. 11 is formed, the adhesive layer 30 may be provided only in the regions R4 at both the axial ends in the same manner as in the case of the insulating member 23C illustrated in FIG. 13. By doing so, it is possible to produce an effect similar to that produced in the case of the insulating member 23C.

Second Embodiment

Figure 15:
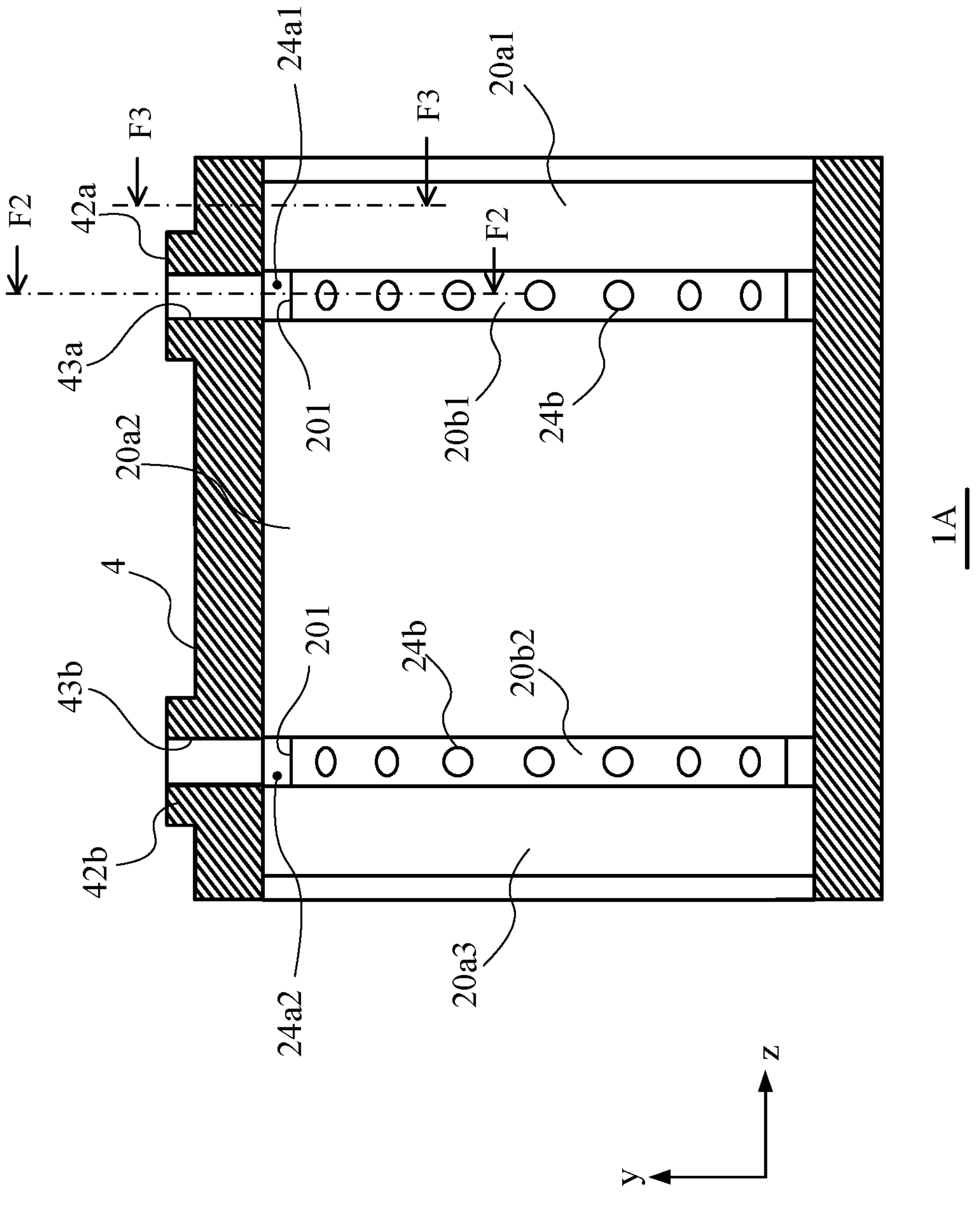
FIG. 15 is a schematic configuration view of a rotating electric machine according to a second embodiment of the invention.

FIG. 15 is a sectional view illustrating a schematic configuration of a rotating electric machine 1A according to a second embodiment of the present invention. FIG. 15 is a view of the rotating electric machine 1A as viewed from the side, and only the case 4 is illustrated in a sectional view for convenience. As illustrated in FIG. 15, in the rotating electric machine 1A of the second embodiment, the stator core 20 includes three stator cores 20*a*1, 20*a*2, and 20*a*3, and two stator cores 20*b*1 and 20*b*2. More specifically, the stator core 20*a*2 is placed at the center along the axial direction, the stator cores 20*b*1 and 20*b*2 are placed on both axial sides of the stator core 20*a*2, and the stator cores 20*al* and 20*a*3 are placed on both axial sides of the stator cores 20*b*1 and 20*b*2, to form the stator core 20.

Figure 16:
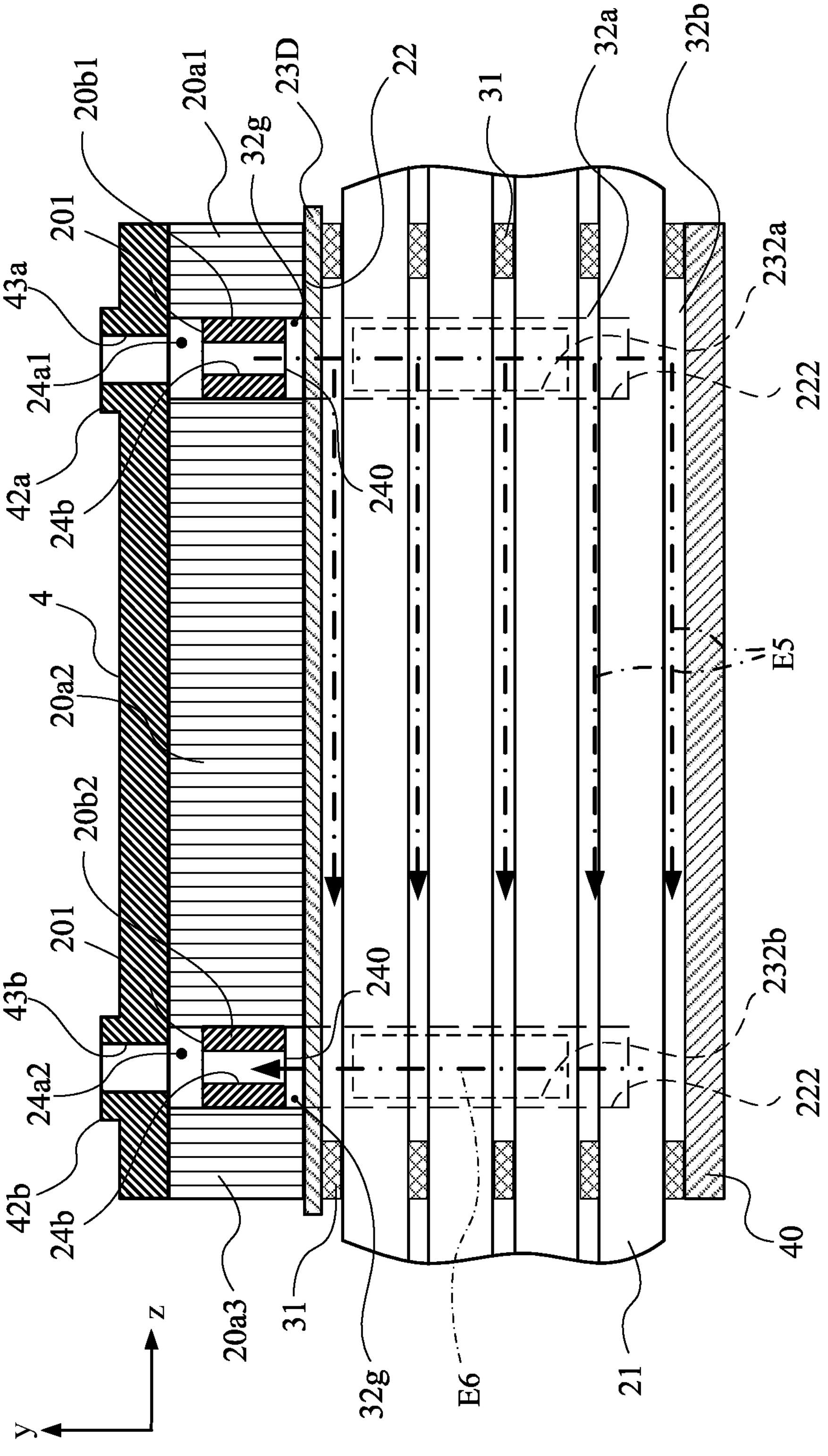
FIG. 16 is a sectional view of the rotating electric machine according to the second embodiment, corresponding to FIG. 2.

The stator cores 20*al* to 20*a*3 and the stator cores 20*b*1 and 20*b*2 are open slots whose inner surfaces are opened, and the slot opening of the slot 22 is closed by a wedge 40 (see FIG. 16). The shapes of the stator cores 20*a*1, 20*a*2, and 20*a*3 in the other respects are the same as that of the stator core 20*a* described above, and the shapes of the stator cores 20*b*1 and 20*b*2 in the other respects are the same as that of the stator core 20*b* described above. However, the axial length of each of the stator cores 20*a*1, 20*a*2, and 20*a*3 is different from that of the stator core 20*a*.

The case 4 includes a cooling-medium introduction portion 42*a* on the outer side of the stator core 20*b*1. In the cooling-medium introduction portion 42*a*, a through hole 43*a* radially penetrating the case 4 is opened. The case 4 includes a cooling-medium discharge portion 42*b* on the outer side of the stator core 20*b*2. In the cooling-medium discharge portion 42*b*, a through hole 43*b* radially penetrating the case 4 is opened.

FIG. 16 is a sectional view of the rotating electric machine 1A corresponding to FIG. 2 (sectional view taken along the line A-A in FIG. 1). The stator coils 21 housed in the slot 22 are enclosed by an insulating member 23D and the wedge 40. The insulating member 23D extends so as to face the slot bottom surface 220 and the slot side surface 221, and three sides (three sides other than the slot-opening side) of an assembly of the stator coils 21 are covered by the insulating member 23D. The wedge 40 is placed so as to cover the slot opening, and the wedge covers the remaining side (slot-opening side) of the assembly of the stator coils 21. For a material of the wedge 40, an insulating material is used. Any insulating member, irrespective of whether it is non-magnetic or magnetic (for example, resin containing a magnetic material, resin of magnetic powder compact, or the like) may be selected.

Between the inner surface of a region where the cooling-medium introduction portion 42*a* is provided in the case and the outer surface 201 of the stator core 20*b*1, an annular channel 24*al* centered on the axis CL1 (FIG. 1) is formed. Likewise, between the inner surface of a region where the cooling-medium discharge portion 42*b* is provided in the case and the outer surface 201 of the stator core 20*b*2, an annular channel 24*a*2 centered on the axis CL1 is formed. The channel 24*al* communicates with the through hole 43*a* of the cooling-medium introduction portion 42*a* and the channel 24*b* of the stator core 20*b*1. The channel 24*a*2 communicates with the through hole 43*b* of the cooling-medium discharge portion 42*b* and the channel 24*b* of the stator core 20*b*2.

Figure 17:
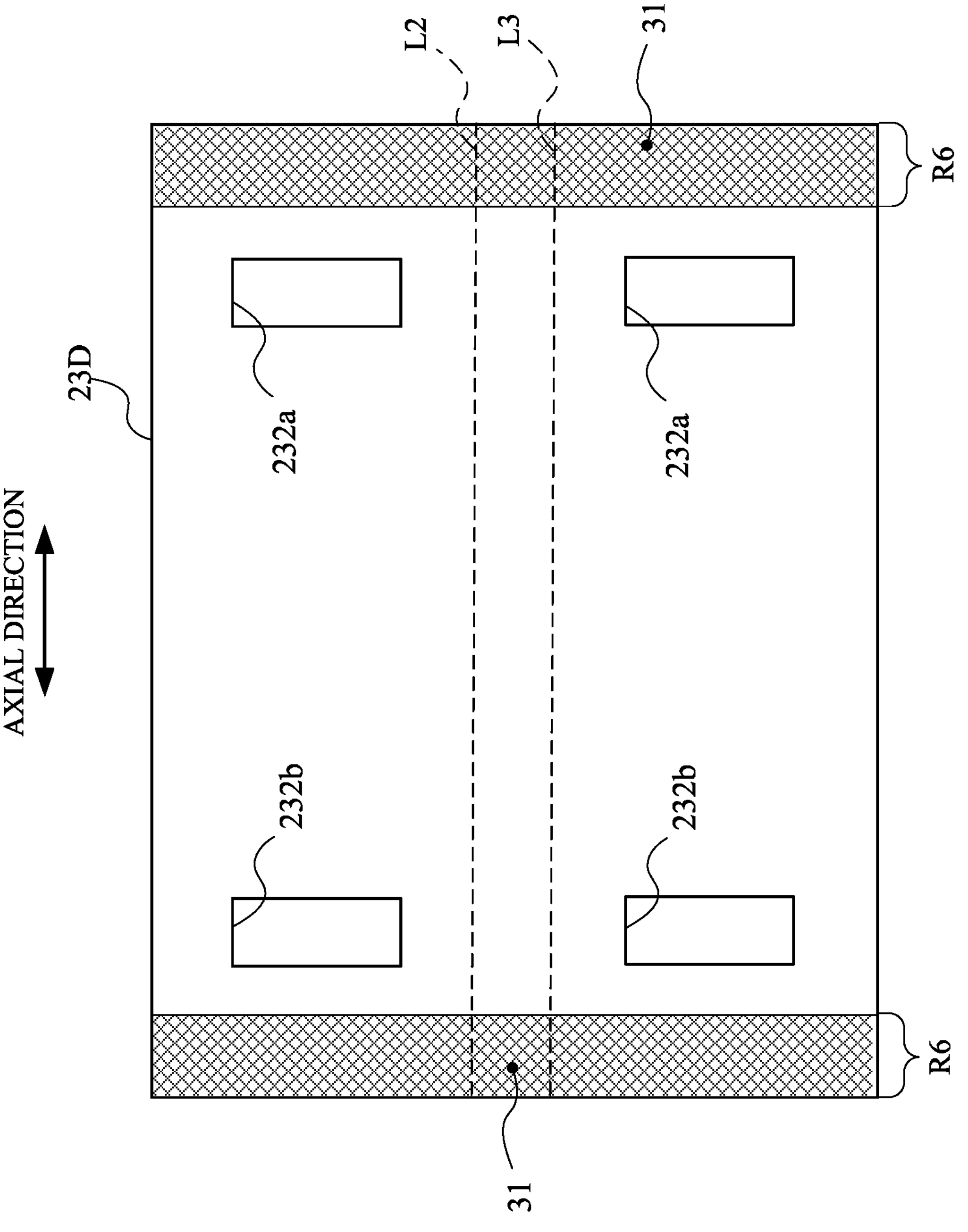
FIG. 17 is a view illustrating a state in which the insulating member in FIG. 16 is developed.

FIG. 17 is a view illustrating the inner-surface side of the insulating member 23D of FIG. 16 when it is developed. As illustrated in FIG. 17, the foam layer 31 is provided in both axial end regions R6 on the inner-surface side of the insulating member 23D. A region between the broken line L2 and the broken line L3 that indicate the bending points is a region facing the slot bottom surface 220 of the slot 22. A region above the broken line L2 in the drawing and a region below the broken line L3 in the drawing are regions facing the side surface of the slot 22. In each of those regions, openings 232*a* and 232*b* are provided close to both the end regions R6, respectively. The axial position of the opening 232*a* is set such that the opening 232*a* can coincide with the opening 240 (see FIG. 16) of the channel 24*b* of the stator core 20*b*1 when the insulating member 23D is attached to the slot 22. Meanwhile, the axial position of the opening 232*b* is set such that the opening 232*b* can coincide with the opening 240 (see FIG. 16) of the channel 24*b* of the stator core 20*b*2 when the insulating member 23D is attached to the slot 22.

When the stator coils 21 are mounted in the slot 22, first, the insulating member 23D being bent is fixed to the slot 22 (the slot bottom surface and the slot side surface). For fixing, an adhesive or the like is used. Subsequently, the stator coils 21 are placed in the inner space of the insulating member 23D. In this case, the stator coils 21 may be arranged such that gaps are formed between the stator coils 21. Then, the wedge 40 is fixed to the slot opening of slot 22. After that, the foam layer 31 is heat-cured. By this heat-curing process, a foam material in a fluid state enters spaces between the stator coils 21, and the gaps between the stator coils 21 in both the end regions R6 of the insulating member 23D are filled with the foam material. In a region between both the end regions R6, gaps (gaps 32*a* and 32*b* described later) are formed between the stator coils 21 and the insulating member 23D and between the stator coils 21.

Figure 18:
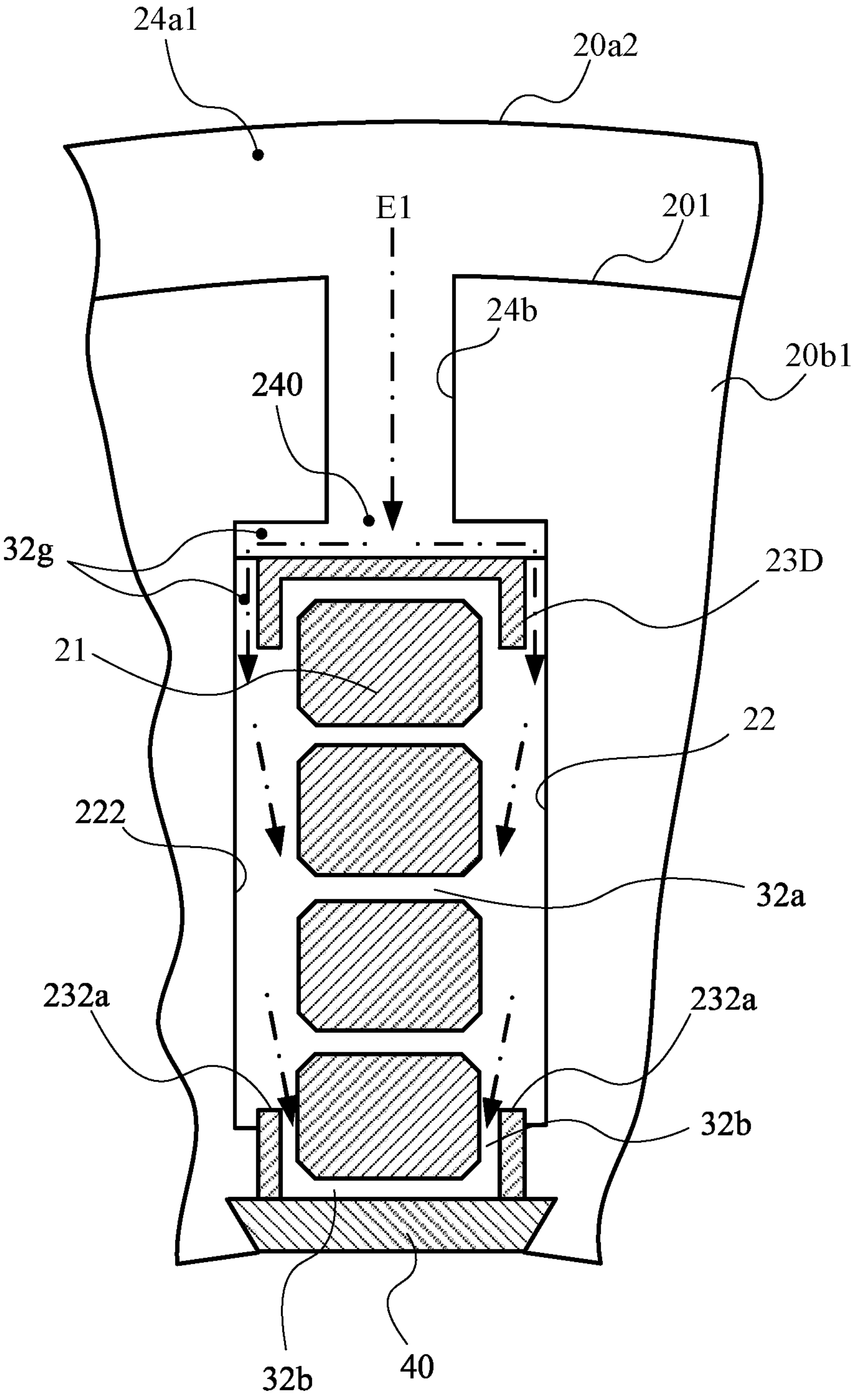
FIG. 18 is a sectional view taken along a line F2-F2 in FIG. 15.

As illustrated in FIG. 16, in the inner wall (slot bottom surface, slot side surface) of the slot 22 of each of the stator cores 20*b*1 and 20*b*2, a depression 222 is provided across a region where the opening 240 of the channel 24*b* is provided and a region facing the opening 232*a* or the opening 232*b* of the insulating member 23D face each other (see also FIG. 18). Thus, in the region of the slot where the depression 222 is provided, a gap 32*g* (see FIG. 18) is formed between the insulating member 23D and the inner wall of the slot. When the foam layer 31 provided in both the end regions R6 on the inner-surface side of the insulating member 23D is heat-cured, the gaps between the stator coils 21 in both the axial end regions are filled with the foam material, to be closed, so that the stator coils 21 are held. Meanwhile, in a region where the foam layer 31 is not provided, the gaps 32*a* and 32*b* are formed around the stator coils 21. In other words, the gap 32*a* is formed between the stator coils 21, and the gap 32*b* is formed between the insulating member 23D and the stator coils 21.

FIG. 18 is a sectional view taken along a line F2-F2 in the cooling-medium introduction portion 42*a* of the stator core 20*b*1 of the rotating electric machine 1A of FIG. 15. Also the sectional view of the stator core 20*b*2 in the cooling-medium discharge portion 42*b* is similar to that of FIG. 18. As illustrated in FIG. 18, the depression 222 (FIG. 16) is formed in the wall surface of the slot 22. Thus, the gap 32*g* is formed between the inner wall of the slot 22 and the insulating member 23D except the vicinity of the wedge 40. Further, in the section of FIG. 18, the foam layer 31 is not provided on the inner-surface side of the insulating member 23D (see FIG. 17), and the gaps 32*a* and 32*b* are formed between the stator coils 21 and the surrounding insulating member 23D and the wedge 40, and between the stator coils 21. Although not illustrated, the foam layer is provided around the wedge 40. Thus, in the portion where the wedge 40 is fixed, the gap between the wedge 40 and stator core 20 is sealed by the foam material when the foam layer is heat-cured.

Figure 19:
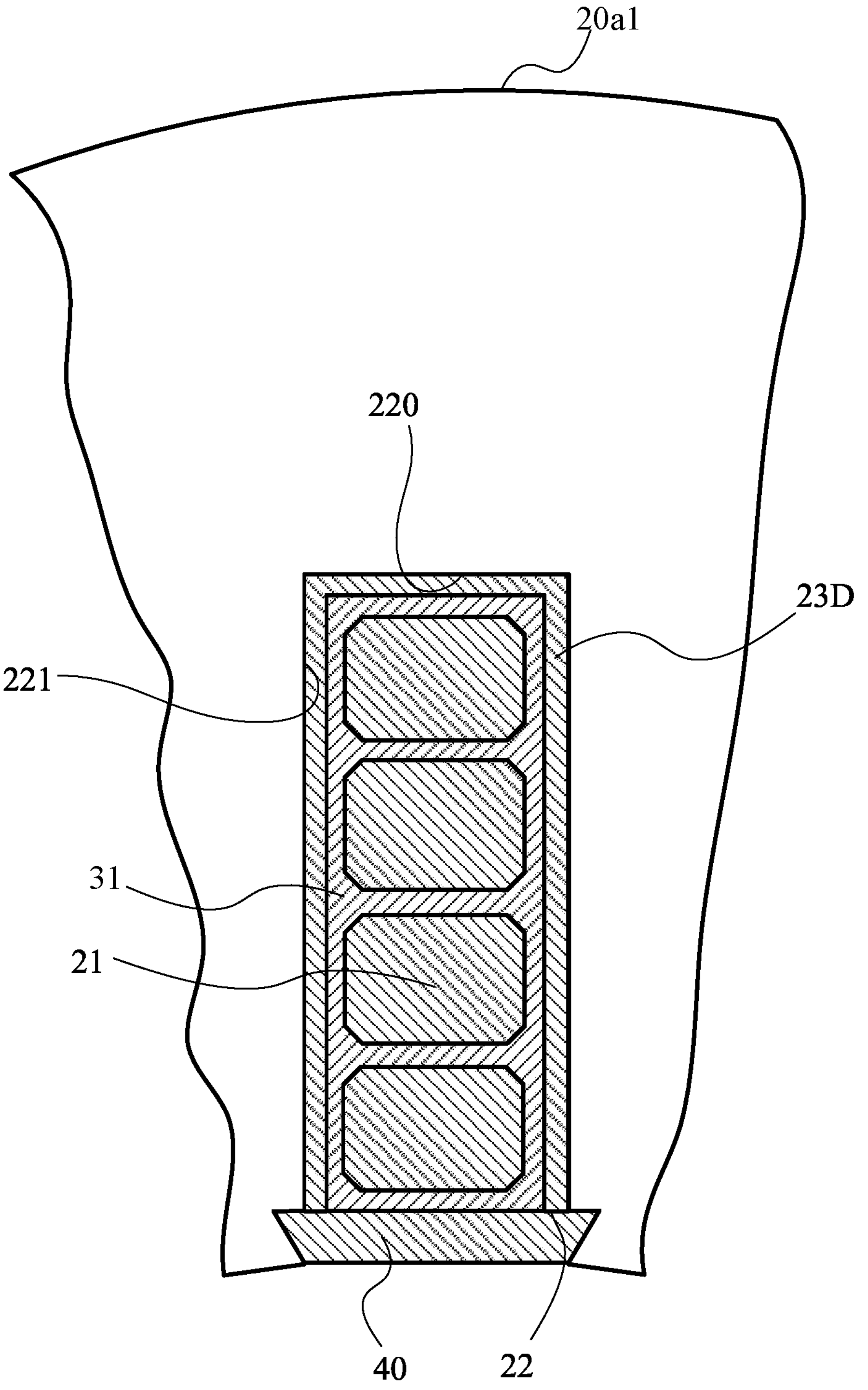
FIG. 19 is a sectional view taken along a line F3-F3 of FIG. 15.

FIG. 19 is a sectional view taken along a line F3-F3 of FIG. 15. More specifically, FIG. 19 is a sectional view of a portion of the stator core 20*a*1, that is, a portion of the left region R6 where the foam layer 31 is provided. As illustrated in FIG. 19, a space between the stator coils 21 and the insulating member 23D and the wedge 40, and a space between the stator coils 21 are filled with the foam material including the foam layer 31.

In FIGS. 16 and 18, an arrow of an alternate long and short dash line indicates flow of the cooling medium. As illustrated in FIG. 16, a cooling medium supplied to the channel 24*al* via the through hole 43*a* of the cooling-medium introduction portion 42*a* flows in the channel 24*al* along the circumferential direction. The cooling medium in the channel 24*al* flows into the gap 32*g* in each slot 22 through the plurality of channels 24*b* that are arranged along the circumferential direction and communicate with the channel 24*a*1. As illustrated in FIG. 18, the cooling medium in the gap 32*g* flows into the space (enclosed space) inside the insulating member 23D via the opening 232*a* of the insulating member 23D.

As described above, the depression 222 is provided in the stator core 20*b*1 to form the gap 32*g*, so that the size of the gap in the region where the opening 232*a* is provided is increased. As a result, the cooling medium easily flows into the gap 32*a* between the stator coils 21 and the gap 32*b* between the insulating member 23D and the stator coils 21. The cooling medium flowing into the enclosed space of the insulating member 23D on one axial side flows in the gaps 32*a* and 32*b* to the other axial side (left side in the drawing) of the insulating member 23D along the axial direction as indicated by an arrow E5 of an alternate long and short dash line in FIG. 16.

The cooling medium reaching the other axial side of the enclosed space of the insulating member 23D flows from the enclosed space of the insulating member 23D to the gap 32*g* of the depression 222 through the opening 232*b* as indicated by an arrow E6. Further, the cooling medium flows into the channel 24*a*2 through the channel 24*b* of the stator core 20*b*2, passes through the through hole 43*b*, and is finally discharged to the outside from the cooling-medium discharge portion 42*b* provided in the case 4.

As described above, in the second embodiment, the gaps 32*a* and 32*b* are sealed with the foam material of the foam layer 31 in the regions at both the axial ends of the coil 21, and the gaps 32*a* and 32*b* are formed in the region between both the end regions, as illustrated in FIG. 16. Therefore, the cooling medium flowing from the opening 232*a* to the one axial end side of the enclosed space of the insulating member 23D easily flows in the gaps 32*a* and 32*b* toward the other axial end side of the enclosed space. Consequently, the cooling effect of directly cooling the coils 21 by the cooling medium can be further improved.

Further, the cooling medium flowing in the gaps 32*a* and 32*b* from the one axial end side (the right side in FIG. 16) to the other axial end side (the left side in FIG. 16) flows through the channel 24*b* of the stator core 20*b*2 via the opening 232*b* of the insulating member 23D, and is discharged to the outside from the cooling-medium discharge portion 42*b* of the case 4. This makes it easier to recover the cooling medium, and can prevent friction degradation under the influence of the cooling medium.

Fourth Modification

Figure 20:
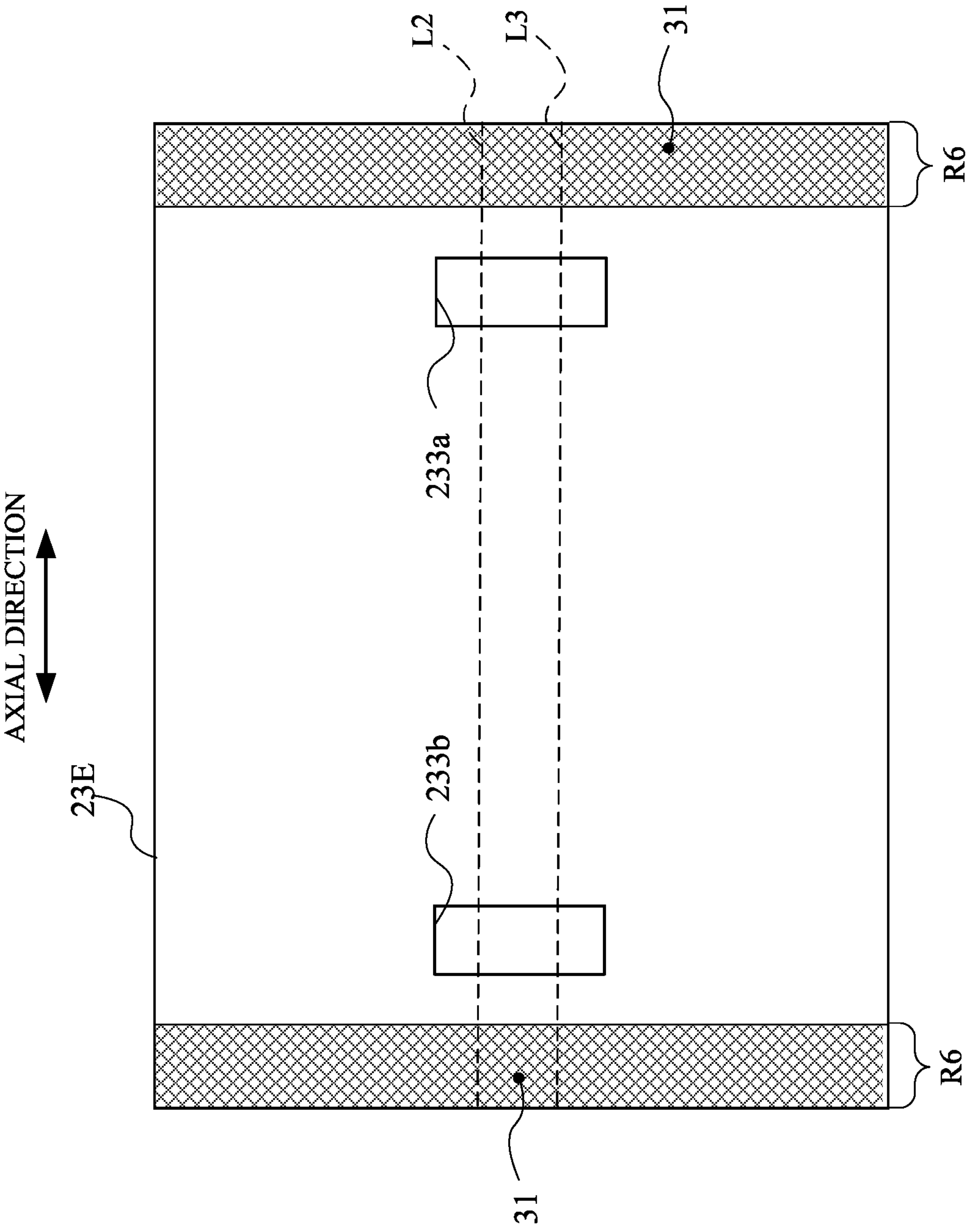
FIG. 20 is a view illustrating a fourth modification which is a modification of FIG. 17.
Figure 21:
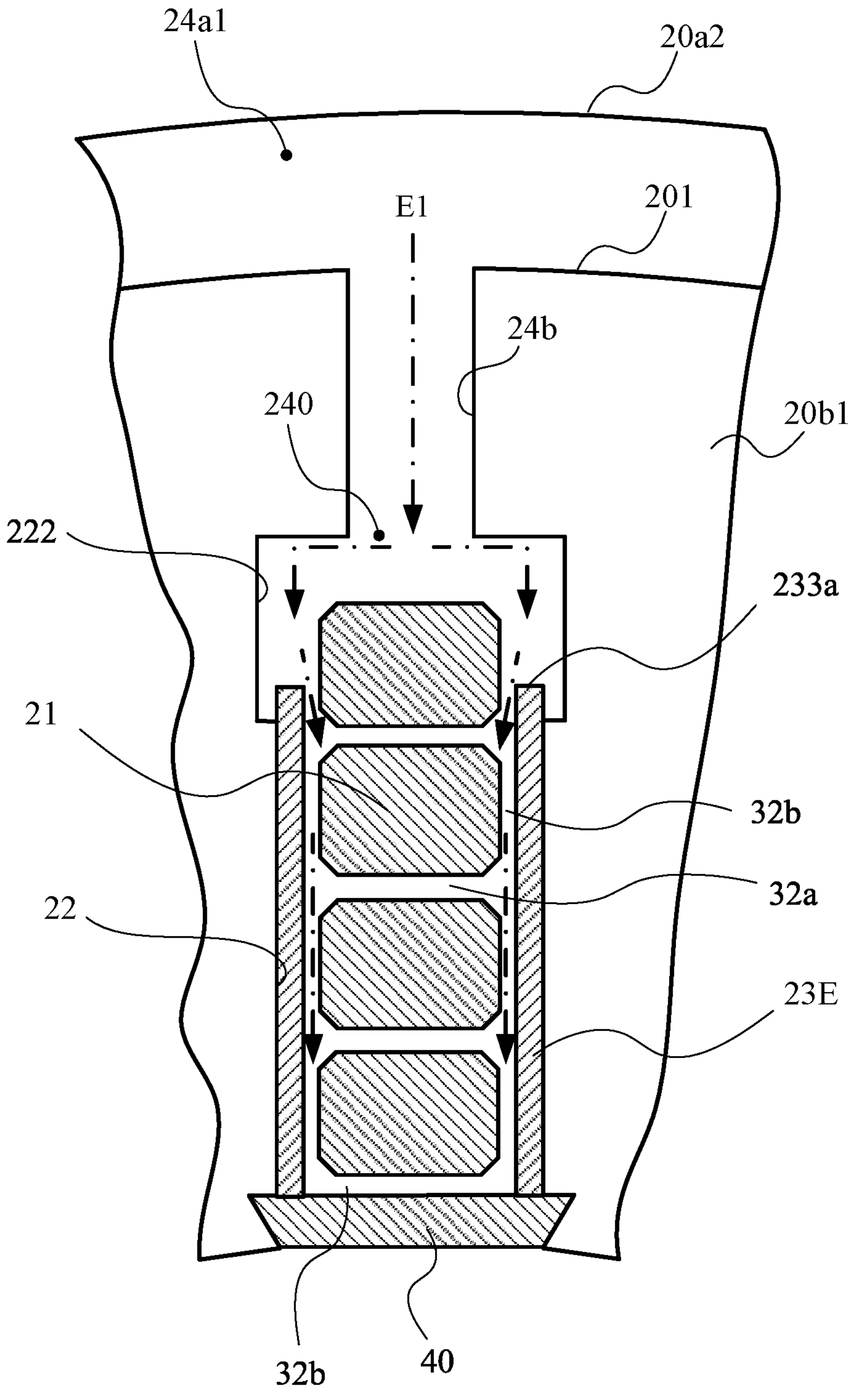
FIG. 21 is a sectional view of the fourth modification.

FIGS. 20 and 21 are views for explaining a modification (fourth modification) of the second embodiment. FIG. 20 is a modification of FIG. 17, and is a view illustrating the inner-surface side of an insulating member 23E when it is developed. As illustrated in FIG. 20, openings 233*a* and 233*b* extend over regions facing the slot side surfaces (upper and lower regions in the drawing) by a predetermined distance, from a region that faces the slot bottom surface and is between the broken lines L2 and L3. The axial positions of the openings 233*a* and 233*b* are the same as the axial positions of the openings 232*a* and 232*b* of the insulating member 23D in FIG. 17. The foam layer 31 is provided in both end regions R6 on the inner-surface side of the insulating member 23E.

FIG. 21 is a modification of FIG. 18, and corresponds to a sectional view taken along the line F2-F2 in FIG. 15 in a case where the insulating member 23E is used. As illustrated in FIG. 21, in the fourth modification, the depression 222 provided in the wall surface of the slot 22 of the stator core 20*b*1 is formed in a region facing the opening 233*a* or the opening 233*b*. The configuration is the same as FIG. 18 in the other respects. An arrow of an alternate long and short dash line indicates flow of a cooling medium. The cooling medium flowing into the slot 22 from the channel 24*al* through the channel 24*b* passes through the space between the depression 222 and the stator coils 21, and then flows into the enclosed space formed by the insulating member 23E and the wedge 40 on one axial end side, via the opening 233*a*. Further, the cooling medium flows to the other axial end side of the enclosed space through the gaps 32*a* and 32*b*, and flows out from the enclosed space via the opening 233*b*, in the same manner as indicated by the arrow E5 in FIG. 16. The cooling medium flowing out via the opening 233*b* flows to the channel 24*a*2 through the channel 24*b* of the stator core 20*b*2, and is discharged from the cooling-medium discharge portion 42*b* via the through hole 43*b*.

Fifth Modification

Figure 22:
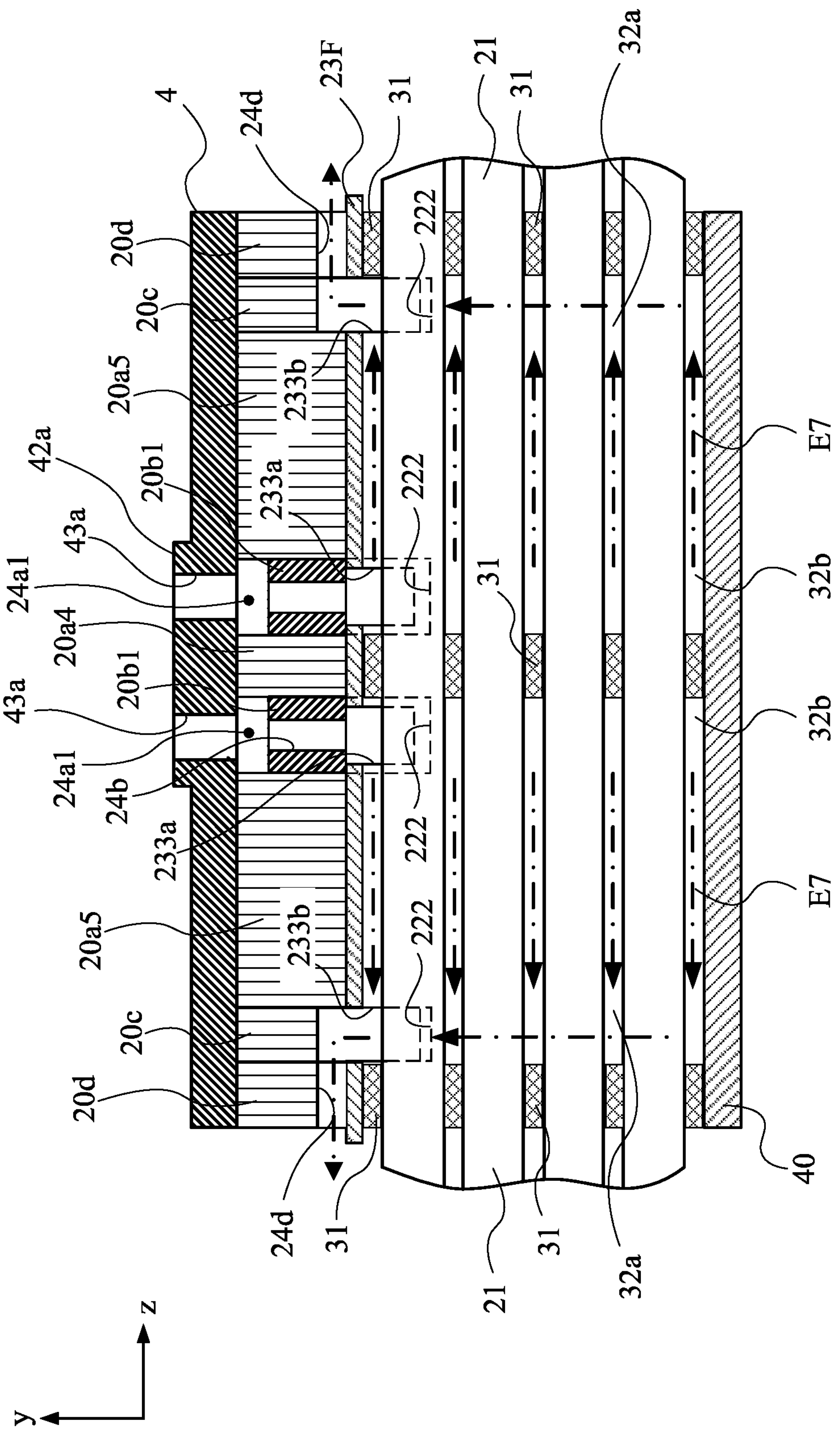
FIG. 22 is a view illustrating a modification of FIG. 16.

FIG. 22 is a view illustrating a modification (fifth modification) of FIG. 16. As illustrated in FIG. 22, in the fifth modification, the stator core 20 includes nine stator cores 20*d*, 20*c*, 20*a*5, 20*b*1, 20*a*4, 20*b*1, 20*a*5, 20*c*, and 20*d*. Specifically, the stator core 20*a*4 is placed at the center along the axial direction, and the stator core 20*b*1, the stator core 20*a*5, the stator core 20*c*, and the stator core 20*d* are placed in this order on one axial side (right side in the drawing) of the stator core 20*a*4. The stator core 20 is configured so as to be axially symmetric about the stator core 20*a*4. Hence, the stator core 20*b*1, the stator core 20*a*5, the stator core 20*c*, and the stator core 20*d* are placed in this order on the other axial side (left side in the drawing) of the stator core 20*a*4. The cooling-medium introduction portion 42*a* is provided at the center of the case 4. The cooling-medium introduction portion 42*a* is provided with a pair of through holes 43*a* facing the pair of stator cores 20*b*1, respectively. The configurations of the stator cores 20*a*4 and 20*a*5 along a direction perpendicular to the axial direction are the same as that of the stator core 20*a* (FIG. 2). The configurations of the stator cores 20*c* and 20*d* along a direction perpendicular to the axial direction will be described later.

Figure 23:
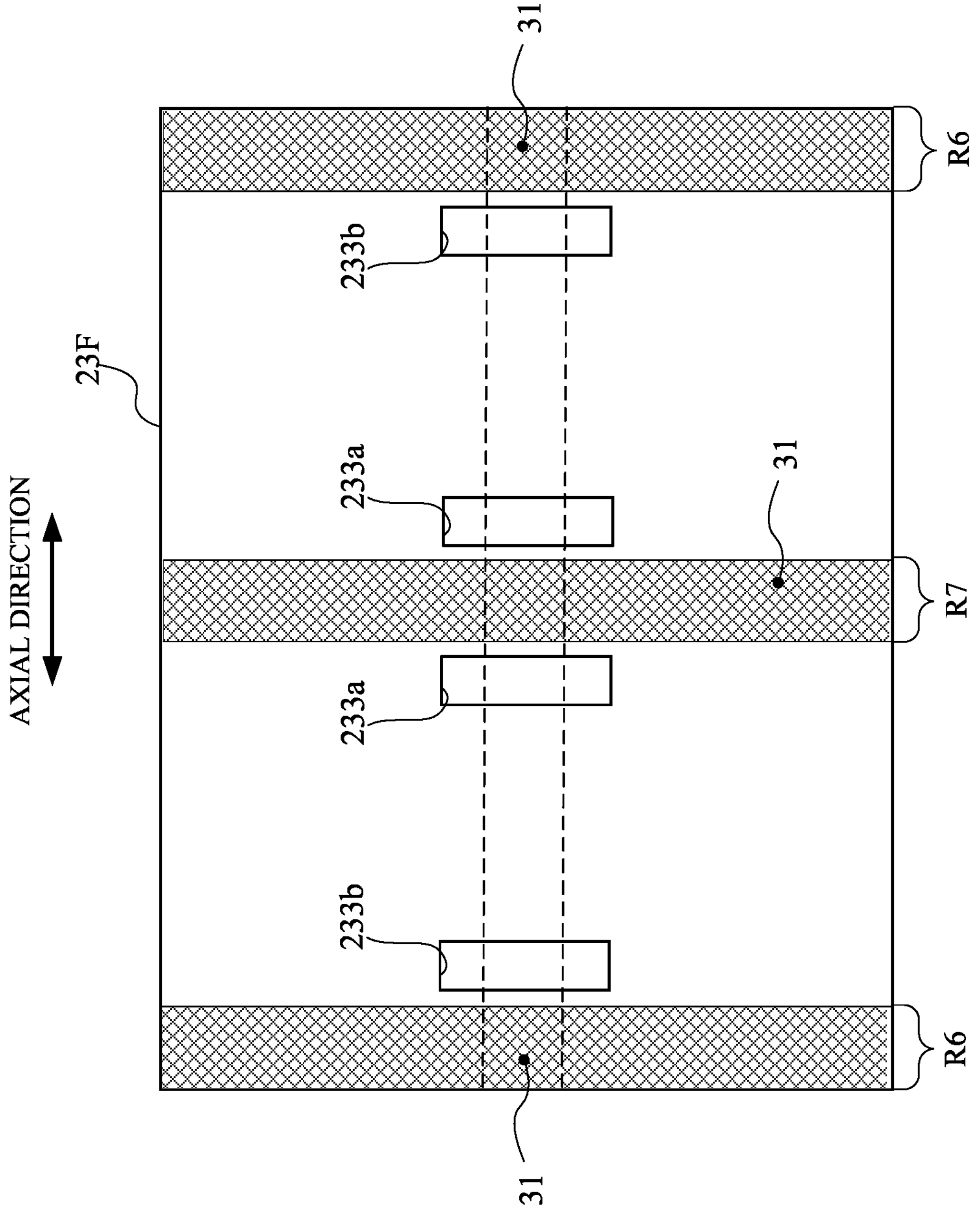
FIG. 23 is a view illustrating a fifth modification which is a modification of FIG. 17.

FIG. 23 is a view illustrating the inner-surface side of an insulating member 23F in FIG. 22 when it is developed. As illustrated in FIG. 23, the foam layer 31 is provided in both axial end regions R6 and a central region R7 on the inner-surface side of the insulating member 23F. In the insulating member 23F, a pair of openings 233*a* are provided close to both sides of the central region R7, and a pair of openings 233*b* are provided close to both the end regions R6, respectively. As illustrated in FIG. 22, when the insulating member 23F is attached to the slot 22, each opening 233*a* faces the channel 24*b* of the stator core 20*b*1. Meanwhile, the opening 233*b* of the insulating member 23F faces the stator core 20*c*.

In the inner wall of the slot 22 of each stator core 20*b*1, the depression 222 is formed in a region facing the opening 233*a*. The shapes of those depressions 222 are the same as the shape of the depression 222 illustrated in FIG. 21. The central region R7 in FIG. 23 is a region placed in the slot 22 of the stator core 20*a*4 at the center along the axial direction. The both end regions R6 in FIG. 23 are regions placed in the slots 22 of the stator cores 20*d* at both the axial ends. Thus, in the enclosed space formed by the insulating member 23F and the wedge 40 in the slot 22 of each of the stator cores 20*a*4 and 20*d*, a gap between the stator coils 21 and the insulating member 23F and the wedge 40 and a gap between the stator coils 21 are filled with the foam layer 31, to be sealed.

Figure 24:
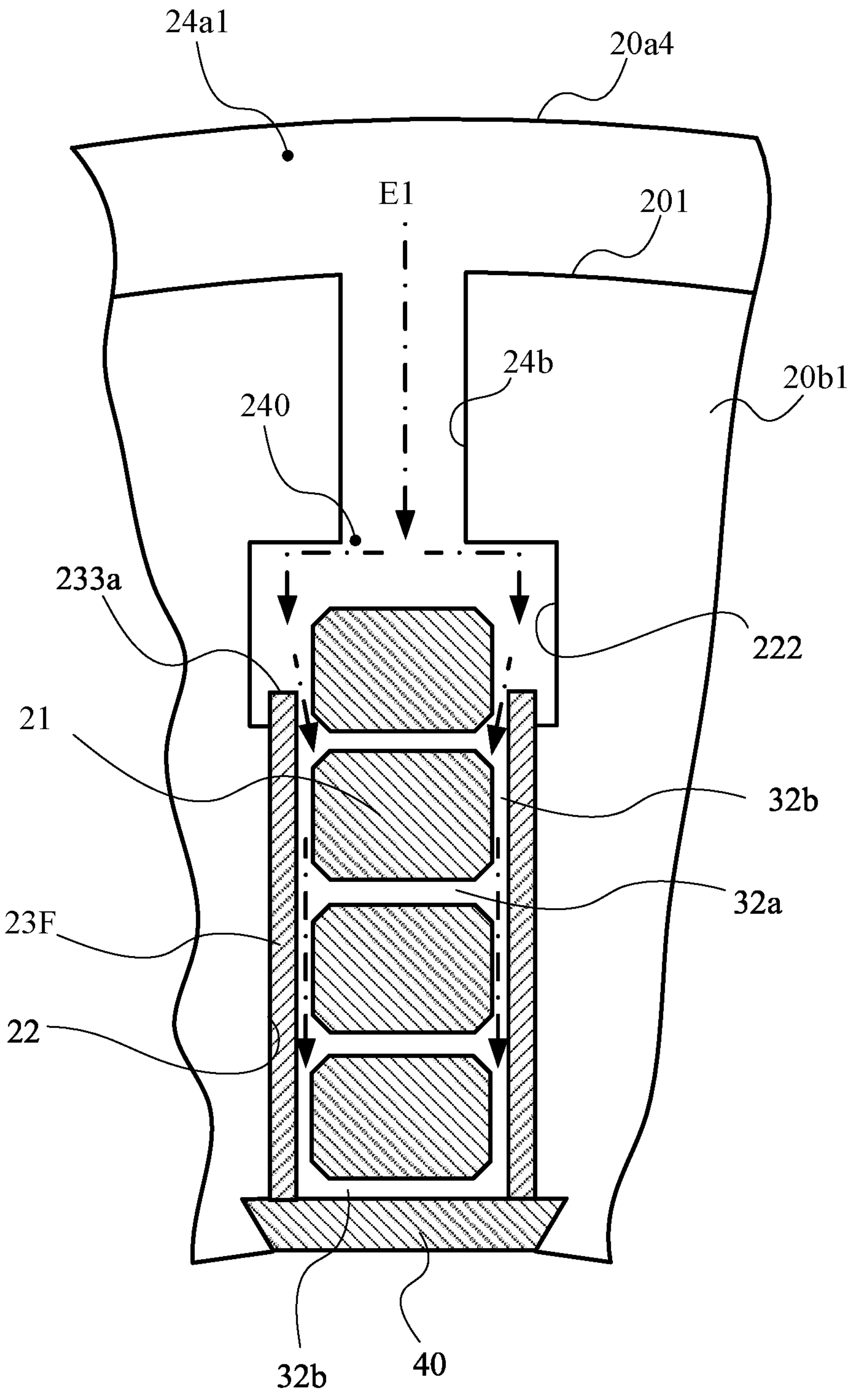
FIG. 24 is a sectional view of the fifth modification.

FIG. 24 is a sectional view perpendicular to the axial direction of the stator core 20*b*1. As described above, in the slot 22 of the stator core 20*b*1, the depression 222 is provided in the region facing the opening 233*a* of the insulating member 23F. Thus, a large gap space is formed in the region of the slot 22 where the opening 233*a* is provided. The cooling medium flowing from the channel 24*b* into the slot 22 flows into the gap space, and then flows into the enclosed space formed by the insulating member 23F and the wedge 40. The cooling medium flowing into the enclosed space flows in the gap in the enclosed space (gaps 32*a* and 32*b* around the stator coils 21) toward the axial end as indicated by an arrow E7 of an alternate long and short dash line in FIG. 22.

Figure 25:
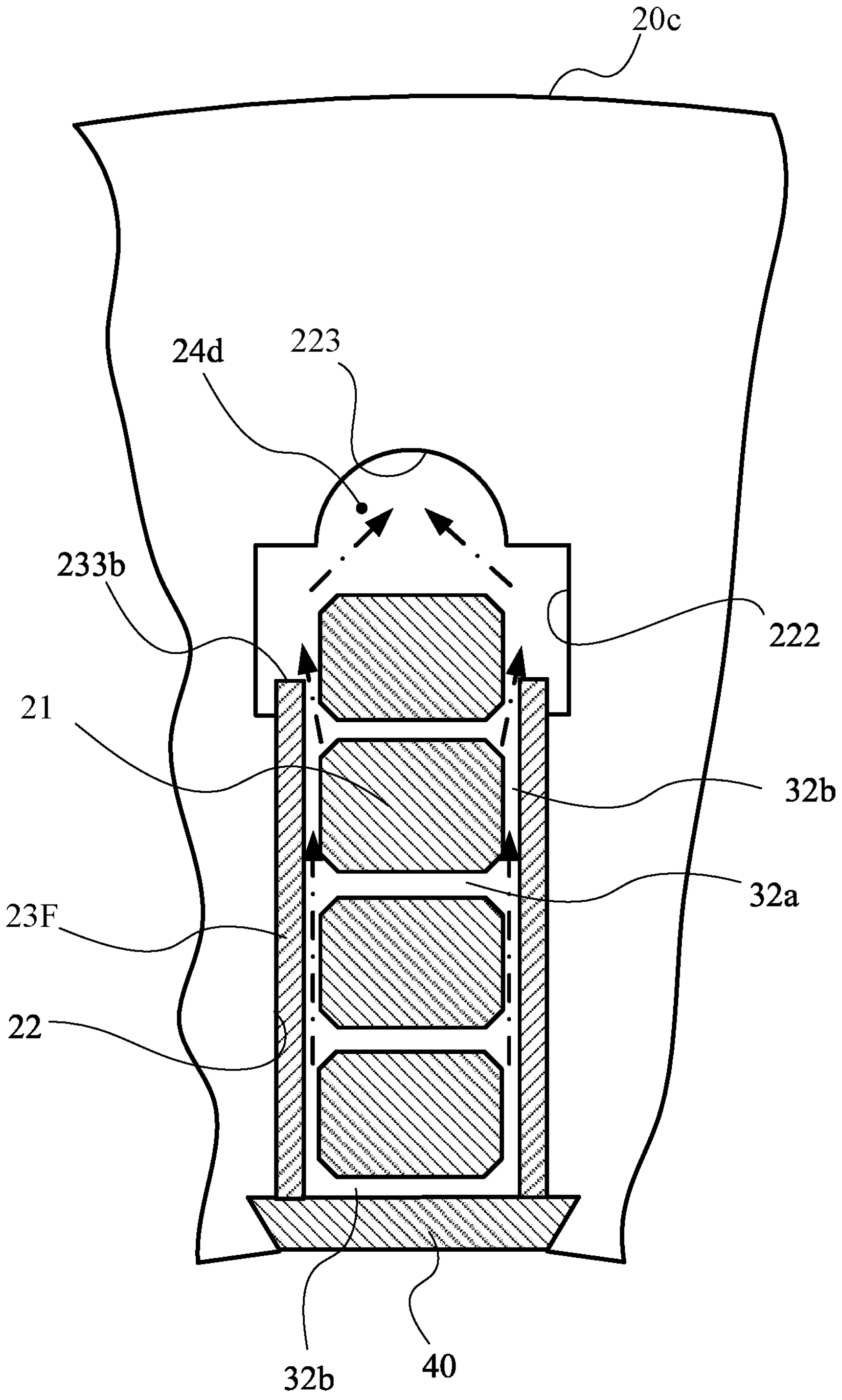
FIG. 25 is a sectional view of an important part of a different part from FIG. 24.

FIG. 25 is a sectional view perpendicular to the axial direction of the stator core 20*c*. As illustrated in FIG. 25, in the slot 22 of the stator core 20*c*, the depression 222 is provided in the region facing the opening 233*b* of the insulating member 23F. Further, a recessed portion 223 is formed in the slot bottom surface. The space in the recessed portion 223 forms a part of the channel 24*d* for discharging the cooling medium. An arrow of an alternate long and short dash line indicates flow of the cooling medium, and the cooling medium flows to the outside of the insulating member 23F from the enclosed space of the insulating member 23F, via the opening 233*b*. The cooling medium flows into the channel 24*d* of the recessed portion 223 via the depression 222.

Figure 26:
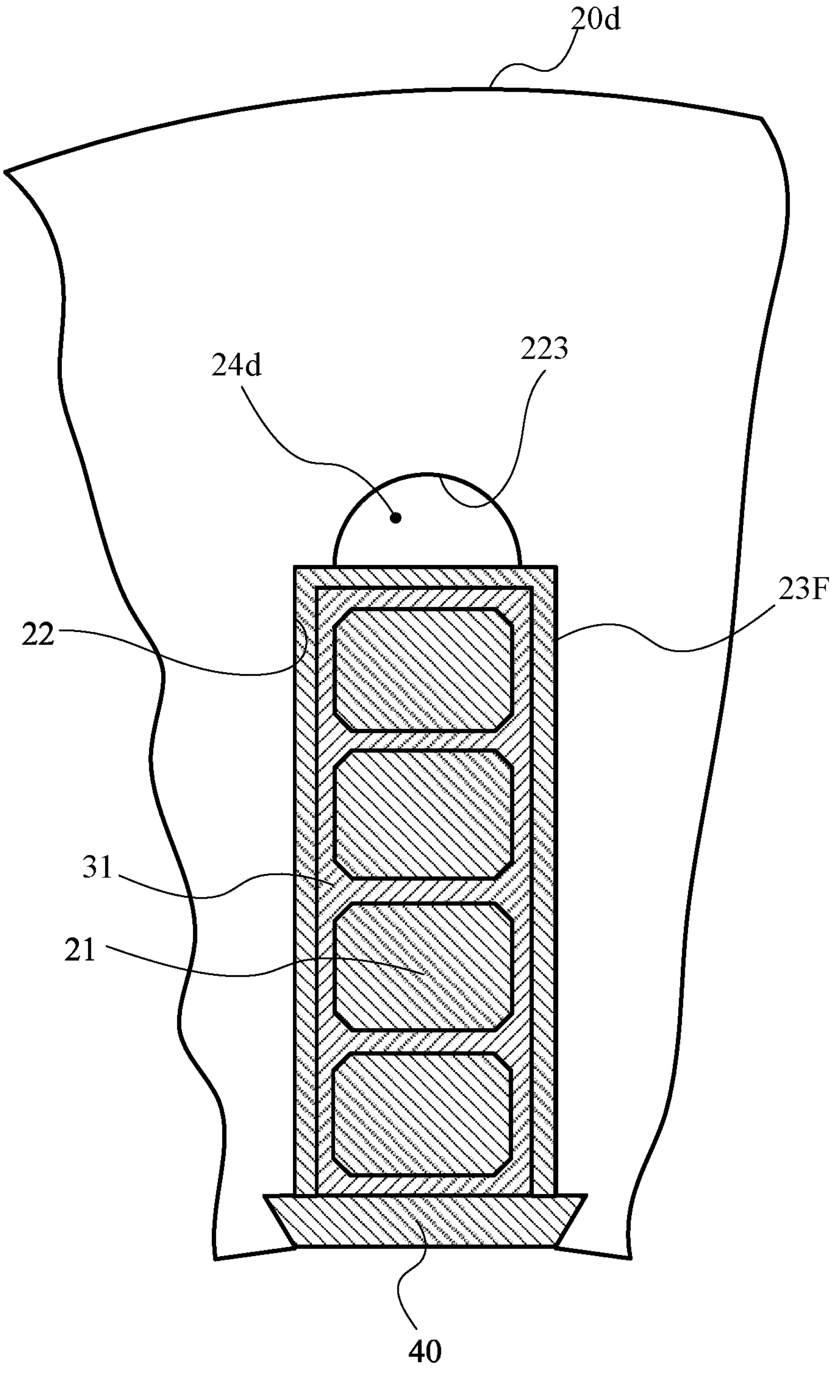
FIG. 26 is a sectional view of an important part of a further different part from FIG. 24.

FIG. 26 is a sectional view perpendicular to the axial direction of the stator core 20*d*. As illustrated in FIG. 26, in the stator core 20*d*, the recessed portion 223 similar to that in the stator core 20*c* is formed in the slot bottom surface. The space in the recessed portion 223 of the stator core 20*d* forms the remaining part of the channel 24*d*. That is, as illustrated in FIG. 22, the channel 24*d* of the stator core 20*c* and the channel 24*d* of the stator core 20*d* communicate with each other. The cooling medium flowing into the space in the recessed portion 223 of the stator core 20*c* via the opening 233*b* of the insulating member 23F passes through the channel 24*d* and is discharged from the axial end face of the stator core 20*d*. The cooling medium discharged from the end face of the stator core 20*d* flows to the coil end, to cool the coil end.

As described above, in the fifth modification, the cooling medium flows from the vicinity of the center where the coil temperature is high toward the coil end, and further, is discharged from the end face of the stator core 20*d*, to be guided to the coil end. Thus, the entire stator coil 21 can be efficiently cooled by the cooling medium. Further, the cooling medium can be prevented from entering an air gap between the stator 2 and the rotor 3, which can prevent friction degradation caused by the cooling medium.

Figure 27:
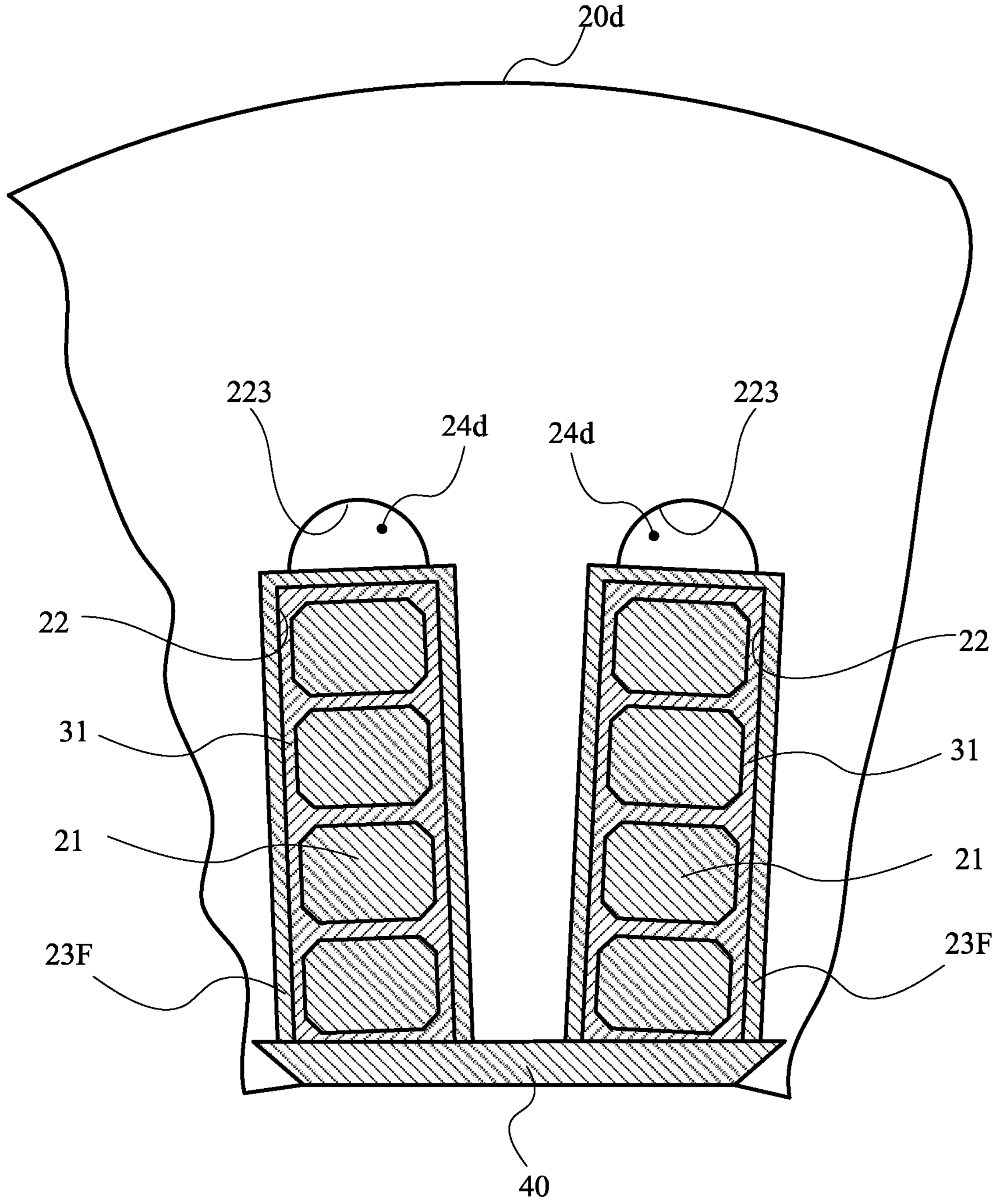
FIG. 27 is a view illustrating another example of a wedge.

In the second embodiment described above, the wedge 40 is provided in each slot 22. However, the present invention is not limited to this configuration, and for example, the wedge 40 may be provided across the plurality of slots 22 as illustrated in FIG. 27. Note that FIG. 27 corresponds to a sectional view of the stator core 20*d*.

In the second embodiment, the slot 22 is configured as an open slot, and the wedge 40 is fixed to the slot opening. Alternatively, the configurations of the stator core 20, the case 4, and the insulating members 23D to 23F of the second embodiment can also be applied to the semi-closed slot 22 of the first embodiment. In that case, the effects similar to those of the second embodiment can be produced.

In the first embodiment, the adhesive layer 30 is provided on the inner surface of the insulating member 23 and the foam layer 31 is provided on the outer surface, but the foam layer may be provided on the inner surface in the same manner as in the second embodiment. In the second embodiment, the foam layer 31 is provided on the inner surface of the insulating member 23D, but the adhesive layer 30 may be provided on the inner surface and the foam layer 31 may be provided on the outer surface in the same manner as in the first embodiment.

According to the embodiments and the modifications of the present invention described above, the following working effects can be produced.

(1) The stator 2 of the rotating electric machine 1 includes the stator coils 21, the insulating member 23 enclosing the stator coils 21, and the annular stator core 20 in which the plurality of slots 22 into which the stator coils 21 enclosed by the insulating member 23 are inserted are formed (FIGS. 1 to 6). In the stator core 20, the channels 24*a* and 24*b* for introducing a cooling medium into each of the plurality of slots 22 are formed (FIGS. 2 and 3). In the insulating member 23, an introduction opening (opening 230) for guiding the cooling medium introduced into the slot 22 to a space (for example, the gaps 32*a* and 32*b*) enclosed by the insulating member 23 is formed (FIGS. 2 and 5).

With this configuration, the cooling medium introduced into the slot 22 through the channel 24*b* is guided from the opening 230 to the gaps 32*a* and 32*b* of the space enclosed by the insulating member 23 and comes into contact with the stator coils 21. As a result, the stator coils 21 are directly cooled by the cooling medium, which can improve the cooling effect on the stator coils 21.

(2) On the inner side of the insulating member 23A, there is formed a channel through which the cooling medium flows along the axial direction via the gaps 32*a* and 32*b*. Thus, as indicated by the arrow E3 in FIG. 9, the cooling medium guided to the space enclosed by the insulating member 23A flows toward the coil end of the stator coils 21 and is discharged at the coil end. As a result, also the coil end is cooled by the cooling medium, and thus the cooling medium can be efficiently used. Further, the cooling medium is discharged at the coil end, which can prevent friction degradation caused due to entry of the cooling medium into an air gap between the stator 2 and the rotor 3.

(3) The channel 24*b* is formed as an outlet in the core back 200 that is an outer side region of the stator core 20 (FIGS. 3 and 10). The opening 240 is provided in the slot bottom surface 220 of the slot 22 (FIG. 10). The opening 231 of the insulating member 23A has the first opening region 231*a* facing the opening 240 and the second opening region 231*b* extending radially inward from the first opening region 231*a* (FIG. 9).

As described above, the opening 231 extends from the first opening region 231*a* facing the opening 240 of the slot bottom surface 220 to the opening region 231*b* facing the slot side surface 221, which allows the cooling medium to easily flow to the inner side of the stator core 20 in the enclosed space of the insulating member 23A. As a result, the cooling medium can efficiently flow into the gap 32*a* on the inner side, which can improve the cooling effect of the cooling medium on the stator coils 21.

(4) The channel 24*b* is formed in the core back 200 that is the outer-side region of the stator core 20*b*1, and includes the opening 240 in the slot bottom surface 220 of the slot 22 (FIGS. 3 and 18). The opening 232*a* faces the slot side surface 221, and the depression 222 is provided in the slot bottom surface 220 and the slot side surface 221 facing the opening 232*a* (FIG. 18). Alternatively, the opening 233*a* has a region facing the opening 240 of the slot bottom surface 220 and a region facing the slot side surface 221, and the depression 222 is provided in the inner wall of the slot 22 facing those regions (FIG. 21).

In this manner, because of inclusion of the depression 222 in the inner wall (wall surface) of the slot 22 facing the openings 232*a* and 233*a*, the cooling medium more easily flows into the enclosed space of the insulating member 23D or 23E. Further, the portions facing the openings 232*a* and 233*a* in the stator coils 21 can be prevented from coming into contact with the stator core 20*b*1, which can improve the insulation.

(5) In the regions R1 and R3 outside the opening 230 along the direction (axial direction) in which the stator coils 21 extend, a filler (adhesive layer 30) to be applied into a gap between the insulating member 23 and the stator coils 21 is provided (FIGS. 4 and 6). In the region R2 where the opening 230 is provided along the direction in which the stator coils 21 extend, the gap 32*b* is formed between the insulating member 23 and the stator coils 21 (FIG. 5).

Because of formation of the gap 32*b* between the insulating member 23 and the stator coils 21 in the region R2, the cooling medium easily flows into the region on the inner side of the stator in the enclosed space inside the insulating member 23. Therefore, the cooling efficiency of the stator coils can be improved.

(6) In the regions R4 on both sides of the insulating member 23C along the direction in which the stator coils 21 extend, a filler (adhesive layer 30) to be applied into the gap 32*b* between the insulating member 23C and the stator coils 21 is provided (FIG. 13). In the regions R2 and R5 interposed between the regions R4 at both axial ends of the insulating member 23C, the gaps 32*b* and 32*d* are formed between the insulating member 23C and the stator coils 21 (FIG. 14). The gaps 32*b* in the regions R4 at both the axial ends are sealed with the adhesive layer 30, which allows the cooling medium to easily flow through the gap in the enclosed space of the insulating member 23C that encloses the stator coils 21, along the axial direction, in the region between the regions R4 at both the ends.

(7) The opening 232*a* of the insulating member 23D is placed on one end side of the insulating member 23D along the direction in which the stator coils 21 extend (FIG. 16), as an introduction opening. The rotating electric machine 1A includes the channels 24*a*2 and 24*b* for discharging the cooling medium from the slot 22 to the outside of the stator core 20 (FIG. 16). In the insulating member 23D, the opening 232*b* that guides the cooling medium flowing through the space (for example, the gaps 32*a* and 32*b*) enclosed by the insulating member 23D to the channel 24*d* is provided as a discharging opening on the other end side of the insulating member 23D along the direction in which the stator coils 21 extend (FIG. 17). With this configuration, the cooling medium flowing through the gaps 32*a* and 32*b* from the one axial end side to the other axial end side can be discharged to the outside of the stator core 20 via the channels 24*a*2 and 24*b*. This makes it easier to recover the cooling medium, and can prevent friction degradation under the influence of the cooling medium.

(8) The insulating member that encloses the stator coils 21 includes a sheet-like insulating member (insulating member 23D) that is placed so as to face the slot bottom surface 220 and the slot side surface 221 of the slot 22, and a fixing member (wedge 40) that closes the slot opening of the slot 22 and is fixed to the stator core 20 (FIG. 19). Note that the fixing member is not limited to the wedge 40 described above as long as the fixing member can prevent the stator coils 21 from being detached from the inside of the slot.

The above embodiment can be combined as desired with one or more of the above modifications. The modifications can also be combined with one another.

According to the present invention, improvement in cooling of the entire stator coil can be made.

Above, while the present invention has been described with reference to the preferred embodiments thereof, it will be understood, by those skilled in the art, that various changes and modifications may be made thereto without departing from the scope of the appended claims.

What is claimed is:

1. A rotating electric machine comprising a rotor and a stator, wherein the stator has a stator coil extending in an axial direction, an insulating member enclosing the stator coil, and an annular stator core in which a plurality of slots into which the stator coil enclosed by the insulating member is inserted are formed, in the stator core, a first channel for introducing a cooling medium into each of the plurality of slots is formed, and in the insulating member, an introduction opening for guiding the cooling medium introduced into a slot, among the plurality of slots, to a space enclosed by the insulating member is provided, wherein the insulating member has, along the axial direction, a first region where the introduction opening is provided and a second region where the introduction opening is not provided, in the first region, a gap is provided between the insulating member and the stator coil, in the second region, a filler to be applied into the gap is provided, and the filler forms a second channel through which the cooling medium guided from the introduction opening flows in the axial direction, the second channel communicating with the gap provided in the first region.

2. The rotating electric machine according to claim 1, wherein a channel is provided inside the insulating member so that the cooling medium guided to the space flows toward a coil end of the stator coil and is discharged at the coil end.

3. The rotating electric machine according to claim 1, wherein the first channel is formed in a core back that is an outer side region of the stator core and across an outlet provided in a slot bottom surface of the slot, and the introduction opening has a first opening portion facing the outlet and a second opening portion extending radially inward of the stator core from the first opening portion.

4. The rotating electric machine according to claim 1, wherein the first channel is formed in a core back that is an outer side region of the stator core and across an outlet provided in a slot bottom surface of the slot, the introduction opening has at least one of a first opening portion facing the outlet and a second opening portion facing a slot side surface of the slot, and a depression portion is provided in a wall surface of the slot facing at least one of the first opening portion and the second opening portion.

5. The rotating electric machine according to claim 1, wherein the filler is an adhesive material with a thermosetting property, and a gap between the insulating member and a wall of the slot is filled with a foam material with a thermosetting property.

6. The rotating electric machine according to claim 1, wherein the filler is a foam material with a thermosetting property.

7. The rotating electric machine according to claim 1, wherein in the insulating member, a discharging opening for discharging the cooling medium flowing through the space to outside of the space is provided at a different position in the axial direction from the introduction opening, and in the stator core, a channel for discharging the cooling medium discharged from the discharging opening from the slot to outside of the stator core is further formed.

8. The rotating electric machine according to claim 7, wherein the introduction opening is provided at an end of the insulating member in the axial direction, and the discharging opening is provided at another end of the insulating member in the axial direction.

9. The rotating electric machine according to claim 7, wherein the discharging opening is a first discharging opening, the introduction opening is provided at a center portion of the insulating member in the axial direction, and the first discharging opening is provided at an end of the insulating member in the axial direction and a second discharging opening is provided at another end of the insulating member in the axial direction.

10. The rotating electric machine according to claim 1, wherein the insulating member has a sheet-like insulating member placed so as to face a side surface and a bottom surface of the slot, and a fixing member closing a slot opening of the slot and fixed to the stator core.

11. A rotating electric machine comprising a rotor and a stator, wherein the stator has a stator coil extending in an axial direction, an insulating member enclosing the stator coil, and an annular stator core in which a plurality of slots into which the stator coil enclosed by the insulating member is inserted are formed, in the stator core, a first channel for introducing a cooling medium into each of the plurality of slots is formed, and in the insulating member, an introduction opening for guiding the cooling medium introduced into a slot, among the plurality of slots, to a space enclosed by the insulating member is provided, wherein the insulating member has, along the axial direction, a first region where the introduction opening is provided and a pair of second regions provided on both sides of the first region in the axial direction where the introduction opening is not provided, in the first region, a gap is provided between the insulating member and the stator coil, in the pair of second regions, a filler to be applied into the gap is provided, and the filler forms a second channel through which the cooling medium guided from the introduction opening flows in the axial direction, the second channel communicating with the gap provided in the first region.

12. A sheet-like insulating member enclosing a stator coil inserted in a plurality of slots provided in a stator core of a rotating electric machine, the insulating member having a first region where an introduction opening for guiding a cooling medium introduced into a slot, among the plurality of slots, through a first channel provided in the stator core to a space enclosed by the insulating member is provided, and a second region where the introduction opening is not provided, wherein in the first region, a gap is provided between the insulating member and the stator coil, in the second region, a filler to be applied into the gap is provided, and the filler forms a second channel through which the cooling medium guided from the introduction opening flows in the axial direction, the second channel communicating with the gap provided in the first region.

* * * * *